(12) United States Patent
Sakai et al.

(10) Patent No.: US 7,443,558 B2
(45) Date of Patent: Oct. 28, 2008

(54) OPTICAL SCANNING DEVICE AND IMAGE FORMING APPARATUS

(75) Inventors: Kohji Sakai, Tokyo (JP); Yoshinori Hayashi, Kanagawa (JP); Daisuke Ichii, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 11/714,162

(22) Filed: Mar. 6, 2007

(65) Prior Publication Data

US 2007/0211324 A1    Sep. 13, 2007

(30) Foreign Application Priority Data

Mar. 13, 2006 (JP) ............... 2006-067323
Mar. 17, 2006 (JP) ............... 2006-074457

(51) Int. Cl.
*G02B 26/08* (2006.01)

(52) U.S. Cl. .................................. 359/205

(58) Field of Classification Search ......... 359/205–208
See application file for complete search history.

(56) References Cited

U.S. PATENT DOCUMENTS

| | | | |
|---|---|---|---|
| 6,215,574 B1 * | 4/2001 | Toyoda | ......... 359/207 |
| 6,348,988 B2 | 2/2002 | Aoki et al. | |
| 6,359,717 B2 | 3/2002 | Suzuki et al. | |
| RE38,195 E | 7/2003 | Sakai et al. | |
| 6,596,985 B2 | 7/2003 | Sakai et al. | |
| 6,704,129 B2 | 3/2004 | Sakai et al. | |
| 6,771,407 B2 | 8/2004 | Hayashi et al. | |
| 6,781,729 B2 | 8/2004 | Suzuki | |
| 6,801,351 B2 | 10/2004 | Suzuki et al. | |
| 6,856,438 B2 | 2/2005 | Takanashi et al. | |
| 6,903,855 B2 | 6/2005 | Aoki et al. | |
| 6,999,208 B2 | 2/2006 | Suzuki et al. | |
| 7,003,242 B2 | 2/2006 | Kida | |
| 7,006,120 B2 | 2/2006 | Sakai et al. | |

(Continued)

FOREIGN PATENT DOCUMENTS

CN    1497269    5/2004

(Continued)

OTHER PUBLICATIONS

Chinese Office Action mailed Jul. 11, 2008 in corresponding application.

*Primary Examiner*—Euncha P Cherry
(74) *Attorney, Agent, or Firm*—Harness, Dickey & Pierce, P.L.C.

(57) ABSTRACT

An optical scanning device includes a first optical element that converts a cross-section shape of a light beam from a semiconductor laser to a desired shape; a second optical element that guides the light beam output from the first optical element to an optical deflector that deflects the light beam; and a third optical element that gathers the light beam deflected by the optical deflector onto a surface to be scanned to form a light spot thereby optically scanning the surface. At least one of the first optical element, the second optical element, and the third optical element includes a resin-made lens, at least one of the resin-made lenses has a power diffracting surface, and a surface shape of at least one of power diffracting surfaces is formed so that a power of a diffracting portion and a power of a refractive portion are cancelled out.

10 Claims, 13 Drawing Sheets

U.S. PATENT DOCUMENTS

| | | |
|---|---|---|
| 7,034,973 B2 | 4/2006 | Sakai |
| 7,038,822 B2 | 5/2006 | Sakai et al. |
| 7,068,407 B2 | 6/2006 | Sakai et al. |
| 7,133,208 B2 | 11/2006 | Kim |
| 2003/0202451 A1* | 10/2003 | Kimura et al. ......... 369/112.08 |
| 2004/0169905 A1 | 9/2004 | Hayashi et al. |
| 2004/0184127 A1 | 9/2004 | Nakajima et al. |
| 2004/0196507 A1 | 10/2004 | Sakai |
| 2005/0179771 A1 | 8/2005 | Ueda |
| 2006/0077500 A1 | 4/2006 | Hayashi et al. |
| 2006/0187294 A1 | 8/2006 | Saisho et al. |

FOREIGN PATENT DOCUMENTS

| | | |
|---|---|---|
| CN | 1621972 | 6/2005 |
| EP | 0 872 754 | 6/2005 |
| JP | 2002-287062 | 10/2002 |
| JP | 2004-280056 | 10/2004 |
| JP | 2005-258392 | 9/2005 |

* cited by examiner

MAIN SCANNING

SUB-SCANNING

OPTICAL SCANNING DEVICE AND IMAGE FORMING APPARATUS

CROSS-REFERENCE TO RELATED APPLICATIONS

The present document incorporates by reference the entire contents of Japanese priority documents, 2006-067323 filed in Japan on Mar. 13, 2006, and Japanese priority document, 2006-074457 filed in Japan on Mar. 17, 2006.

BACKGROUND OF THE INVENTION

1. Field of the Invention

The present invention generally relates to an optical scanning device that can be employed in an image forming apparatus. The present invention specifically relates to a lens in an optical scanning device.

2. Description of the Related Art

Conventionally, optical scanning devices have been widely used in image forming apparatuses, such as optical printers, digital copiers, or optical plotters. In recent years, low-price optical scanning devices less prone to be influenced by environmental fluctuations and configured to support formation of high-definition images have been desired.

When various lenses for use in an optical scanning device are formed of a resin material, such resin-made lenses are light-weight and can be formed at low cost. Also, it is easy to form a special surface shape typified by an aspheric surface. Therefore, with a special surface being adopted for a resin-made lens, optical characteristics can be improved, and the number of lenses forming an optical system can be reduced. That is, adoption of a resin-made lens contributes to making the optical scanning device compact, light-weight, and low-cost.

On the other hand, however, the resin-made lens may be changed in shape and refractive index according to environmental changes, in particular, temperature changes. Therefore, there is a problem in which the optical characteristics, in particular, power, are changed from design values and a beam spot diameter, which is a diameter of a light spot at the time of light-gathering of light beams on a plane to be scanned, is varied according to environmental variations.

In one method, since the power variations of the resin-made lens according to temperature variations occur conversely between a plus lens and a minus lens, plus and minus resin-made lenses are included in an optical system of an optical scanning device and changes in optical characteristics occurring in these plus and minus resin-made lenses due to environmental changes are cancelled out.

Also, a semiconductor laser, which is generally used as a light source for an optical scanning device, has a property in which a light-emitting wavelength is shifted to a long wavelength side as the temperature increases (wavelength changes due to temperature changes), and also has a wavelength change due to a mode hop. A change in wavelength in the light source may cause a change in characteristics due to chromatic aberration of the optical system for use in the optical scanning device, and this change in characteristic also may cause a variation in beam spot diameter.

Therefore, in an optical scanning device including a resin-made lens in an optical system and using a semiconductor laser as a light source, optical design has to be made in consideration of changes in optical characteristics according to temperature changes and also changes in optical characteristics according wavelength changes in the light source.

One known example of an optical scanning device (laser scanning device) adopting a diffracting surface to stabilize optical characteristics in consideration of changes in optical characteristics according to changes in temperature and wavelength changes at the light source is disclosed in Japanese Patent Application Laid-Open No. 2002-287062.

Japanese Patent Application Laid-Open No. 2002-287062 discloses an optical scanning device in which laser light emitted from a laser light source is parallel light in a main scanning direction, and an optical system for light-gathering near a deflection reflecting surface of an optical deflector in a sub-scanning direction is made as "one optical element having one or more reflecting surfaces without having a rotational axis of symmetry, having two transmission surfaces provided with a power diffracting surface, and being made of resin". Furthermore, as a comparison example, "an optical scanning device provided with a resin-made collimator lens that collimates light beams from a semiconductor laser and resin-made cylindrical lenses for light-gathering of the collimated light beams in a sub-scanning direction each provided with one diffracting surface" is disclosed. The diffracting surface is a diffracting surface having lens power due to diffraction.

Japanese Patent Application Laid-Open No. 2005-258392 discloses an optical scanning device configured to be provided with a lens having a diffracting surface before a deflector.

However, in the optical system formed of "one optical element having one or more reflecting surfaces without having a rotational axis of symmetry, having two transmission surfaces provided with a power diffracting surface, and being made of resin", the transmission surfaces and the reflecting surfaces have to be formed in one optical element. Since a curved reflecting surface is included, manufacturing of such is not necessarily easy, and a further improvement has to be made in view of cost reduction of the optical scanning device.

Furthermore, in general, the diffracting surface requires microfabrication technology, and also requires extremely high accuracy. For example, a power diffracting surface having power equivalent to that of a spherical lens as depicted in FIG. 14A has a shape as depicted in FIG. 14B, that is, a shape obtained by folding the spherical surface so as to have a uniform height with respect to a substrate.

As evident from FIG. 14B, this power diffracting surface has narrower groove spaces as they are further distanced from an optical axis, and therefore processing these grooves is extremely difficult. Furthermore, the power diffracting surface interposed between back cuts has to form part of the spherical surface. This can be formed as a straight line for approximation, but, in this case, diffraction efficiency is inevitably decreased.

However, if the power diffracting surface is formed so as to form part of the spherical surface, roughness in surface shape is conspicuous. As a result, problems occur such that the beam spot diameter may be increased due to deterioration in wave aberration and, due to the occurrence of diffused light, ghosts may occur or light transmission efficiency may be decreased.

Still further, when a surface opposite to the diffracting surface is a refractive surface, optical characteristics are deteriorated due to eccentricity between these two surfaces.

Still further, in the optical scanning device disclosed in Japanese Patent Application Laid-Open No. 2005-258392, the optical element using a diffracting surface before the deflector is used. Due to strong power of the diffracting surface, the diffracting lens has a less tolerance to eccentricity between surfaces. Moreover, since each segment of the diffracting surface is significantly shifted from a plane, processing and measurement are difficult. As a result, excellent optical characteristics cannot be achieved.

SUMMARY OF THE INVENTION

It is an object of the present invention to at least partially solve the problems in the conventional technology.

According to an aspect of the present invention, an optical scanning device includes a first optical element that converts a cross-section shape of a light beam from a semiconductor laser to a desired shape; a second optical element that guides the light beam output from the first optical element to an optical deflector that deflects the light beam; and a third optical element that gathers the light beam deflected by the optical deflector onto a surface to be scanned to form a light spot thereby optically scanning the surface. At least one of the first optical element, the second optical element, and the third optical element includes a resin-made lens, at least one of the resin-made lenses has a power diffracting surface, and a surface shape of at least one of power diffracting surfaces is formed so that a power of a diffracting portion and a power of a refractive portion are cancelled out.

According to another aspect of the present invention, an optical scanning device includes a first optical element that converts a cross-section shape of a light beam from a semiconductor laser to a desired shape; a second optical element that guides the light beam output from the first optical element to an optical deflector that deflects the light beam; and a third optical element that gathers the light beam deflected by the optical deflector onto a surface to be scanned to form a light spot thereby optically scanning the surface. At least one of lenses forming the first optical element and the second optical element includes a resin-made lens, at least one of resin-made lenses satisfies conditions (1) to (4):

(1) only one surface of the resin-made lens has a diffracting surface $$|P3| \geq |P1+P2| \quad (2)$$

$$|P1| > |P1+P2| \text{ and } |P2| > |P1+P2| \quad (3)$$

$$P1 \times P3 > 0 \quad (4)$$

where P1 is a power in any of a main scanning direction and a sub-scanning direction of a diffracting portion on a diffracting surface of the resin-made lens, P2 is a power of a refractive portion on the diffracting surface in the direction defined in P1, and P3 is a power on a surface other than the diffracting surface of the resin-made lens in the direction defined in P1.

According to still another aspect of the present invention, an image forming apparatus includes the above optical scanning device that performs optical scanning on a photosensitive image carrier to form a latent image; a developing unit that visualizes the latent image as a toner visualized image; and an image forming unit that generates an image from the toner visualized image.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained below while referring to the accompanying drawings.

Figure 1:
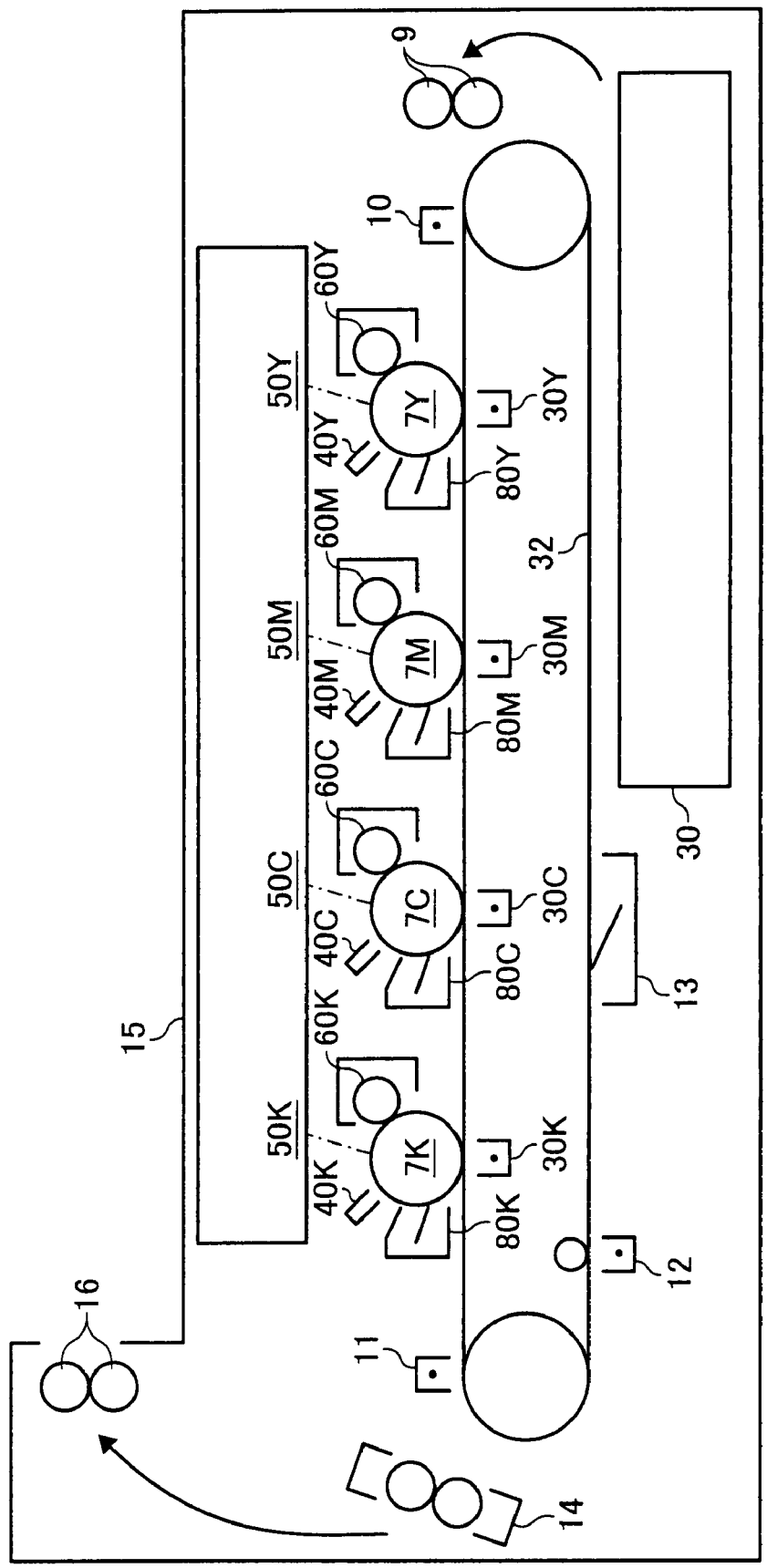
FIG. 1 is a schematic side view of the configuration of an image forming apparatus including an optical scanning device according to a first embodiment of the present invention.

FIG. 1 is a schematic diagram of the configuration of an image forming apparatus including an optical scanning device according to a first embodiment. The image forming apparatus according to the first embodiment is a tandem-type full-color optical printer. In FIG. 1, in a lower portion of the apparatus, a conveyor belt 32 is provided that conveys in an approximately horizontal direction a transfer sheet (not shown) fed from a paper-feeding cassette 30 disposed in a horizontal direction. On an upper surface side of the conveyor belt 32, a photosensitive member 7Y for yellow Y, a photosensitive member 7M for magenta M, a photosensitive member 7C for cyan C, and a photosensitive member 7K for black K are disposed in this order so as to be equally spaced apart from each other from an upstream side in a direction of conveying a transfer sheet by the conveyor belt 32.

Distinction among yellow, magenta, cyan, and black is hereinafter made by suffixes Y, M, C, and K attached to reference numerals. The photosensitive members 7Y, 7M, 7C, and 7K also function as image carriers, have all the same diameter, and are each sequentially surrounded by process members disposed for performing an image forming process according to an electrophotography process. As for the photosensitive member 7Y as an example, an electrical charger 40Y, an optical scanning device 50Y, a developing device 60Y, a transfer charger 30Y, and a cleaning device 80Y are sequentially disposed in a clockwise direction, which is a rotating direction of the photosensitive member. Similarly, the photosensitive member 7M is surrounded by an electrical charger 40M, an optical scanning device 50M, a developing device 60M, a transfer charger 30M, and a cleaning device 80M; the photosensitive member 7C is surrounded by an electrical charger 40C, an optical scanning device 50C, a developing device 60C, a transfer charger 30C, and a cleaning device 80C; and the photosensitive member 7K is surrounded by an electrical charger 40K, an optical scanning device 50K, a developing device 60K, a transfer charger 30K, and a cleaning device 80K. That is, this image forming apparatus takes the photosensitive members 7Y, 7M, 7C, and 7K as surfaces to be scanned that are set for the respective color components, and the optical scanning devices 50Y, 50M, 50C, and 50K are provided so as to each have a one-to-one relation with the relevant one of these surfaces.

The optical scanning devices 50Y, 50M, 50C, and 50K can be implemented as independent optical scanning devices each having an optical arrangement as depicted in the present embodiment. Also, for example, as those conventionally known from Japanese Patent Application Laid-Open No. 2004-280056, an optical deflector (rotational polygon mirror) can be shared, and a lens 6-1 (refer to an embodiment depicted in FIG. 4) of a scanning optical system in each optical scanning device can be shared for optical scanning by the photosensitive members 7M and 7Y and also for optical scanning by the photosensitive members 7K and 7C.

The conveyor belt 32 is surrounded by resist rollers 9 and a belt electrical charger 10 that are positioned on an upstream side of the photosensitive member 7Y in a direction of conveying a transfer sheet, and also by a belt separation charger 11, a static eliminating charger 12, a cleaning device 13, and other components that are positioned on a downstream side of the photosensitive member 7K. On a downstream side of the belt separation charger 11 in the conveying direction, a fixing device 14 is provided and connected by paper delivery rollers 16 toward a paper delivery tray 15.

In such a configuration as explained above, for example, at the time of full-color mode, when the surface of each of the photosensitive members 7Y, 7M, 7C, and 7K uniformly changed by the electrical chargers (that is, the surface to be scanned) is optically scanned by the relevant one of the optical scanning devices 50Y, 50M, 50C, and 50K based on the relevant one of the colors, Y, M, C, and K, an electrostatic latent image is formed on the surface of each photosensitive member. The electrostatic latent image is supplied with the corresponding color toner from the corresponding developing device for development to become a toner image. The toner images of the respective colors are sequentially transferred onto a transfer sheet electrostatically attached onto the conveyor belt 32 and conveyed thereby, thereby becoming a full-color image. The full-color image is fixed by the fixing device 14, and then the transfer paper is delivered onto the paper delivery tray 15.

Figure 2:
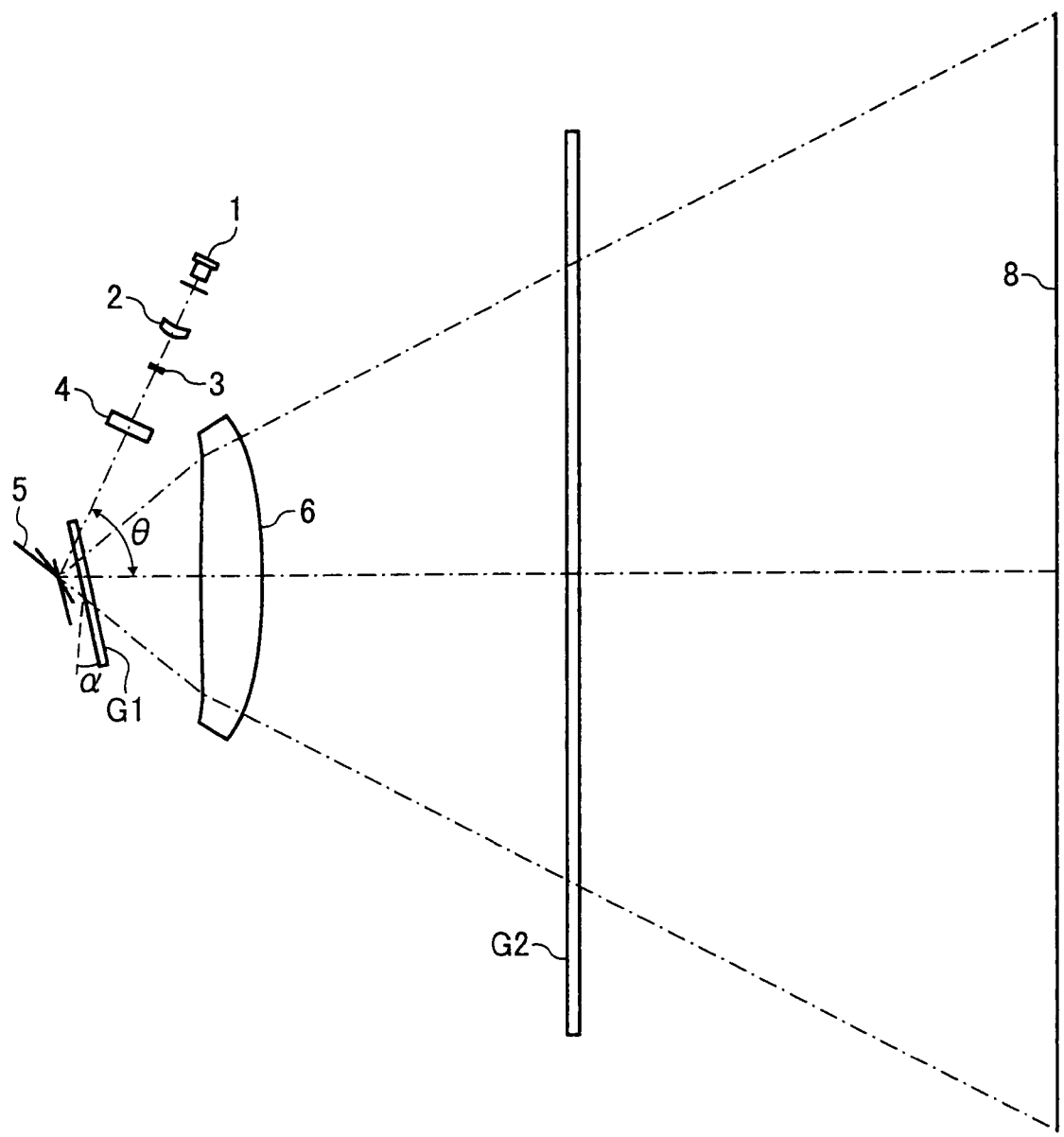
FIG. 2 depicts an arrangement of optical elements in the optical scanning device shown in FIG. 1.

Details about the optical scanning device inside the image forming apparatus according to the first embodiment are explained below. FIG. 2 is a configuration diagram that depicts an arrangement of optical elements of the optical scanning device according to the first embodiment. In FIG. 2, 1 denotes a semiconductor laser as a light source, 2 denotes a coupling lens as a first optical element, 3 denotes an aperture, 4 denotes an anamorphic optical element as a second optical element, 5 denotes a polygon mirror (rotational polygon mirror) as an optical deflector, 6 denotes a scanning lens as a third optical element, and 8 denotes a surface to be scanned. Also, G1 denotes a sound-shielding glass for shielding a window of a sound-shielding housing (not shown) that has accommodated therein the polygon mirror 5, whilst G2 denotes a dust-proof glass provided at a deflected-light-beam ejecting unit of a housing having accommodating therein the optical system of the optical scanning device depicted in FIG. 2.

A diverged light beam emitted from the semiconductor laser 1 is converted by the coupling lens 2 to a light beam having a desired cross-section, is beam-shaped through the aperture 3, and then enters the anamorphic optical element 4. The light beam passing through the anamorphic optical element 4 converges in a sub-scanning direction and also passes through the sound-shielded glass G1 to form an image as a linear image elongated in the main scanning direction near a deflection reflecting surface of the polygon mirror 5. The light beam is reflected onto the deflection reflecting surface of the polygon mirror 5 to pass through the sound-shield glass G1 to enter the scanning lens 6. The scanning lens 6 is formed of one lens. The light beam passing through this lens 6 then passes through the dustproof glass G2 to enter the surface to be scanned 8, thereby forming a light spot on the surface to be scanned 8 by the action of the scanning lens 6.

The polygon mirror 5 is driven by a motor for rotation with constant velocity. When the polygon mirror 5 is rotated with constant velocity, the light beam reflected from the deflection reflecting surface is deflected with constant angular velocity. The scanning lens 6 has an fθ characteristic in which the light spot of the light beam entering as being deflected with constant angular velocity is moved with constant velocity in the main scanning direction (vertical direction in FIG. 2) on the surface to be scanned 8. The light spot optically scans the surface to be scanned 8 with constant velocity. The scanning lens 6 is an anamorphic optical element and produces, in a sub-scanning direction, a geometrical-optical conjugate relation between the position of the deflection reflecting surface of the polygon mirror 5 and the position of the surface to be scanned 8. With this, a surface falling of each deflection reflecting surface of the polygon mirror 5 is corrected. The surface to be scanned 8 is substantially a photosensitive surface of a photosensitive medium, for example, a photosensitive drum.

Next, a first specific configuration example forming the first embodiment is explained. Data on a glass material (hereinafter, "first glass") and a resin material (hereinafter, "first resin") for use in the first embodiment is listed in Table 1.

TABLE 1

|  | Median value | Wavelength hop | Temperature variation | Linear expansion coefficient |
|---|---|---|---|---|
| First glass | 1.511084 | 1.511068 | 1.511027 | $7.5 \times 10^{-5}$ |
| First resin | 1.523867 | 1.523852 | 1.522026 | $7.0 \times 10^{-5}$ |

In Table 1, a "median value" represents a refraction index with respect to a use wavelength at a reference temperature of 25 degrees Celsius, a "wavelength hop" represents a refraction index when a wavelength hop occurs due to a mode hop, and a "temperature variation" represents a refraction index when the temperature increases from the reference temperature by 20 degrees Celsius. In the "wavelength hop" due to a mode hope, a wavelength change of 0.8 nanometers is assumed for allowance.

Table 2 depicts data on optical system components disposed after the optical deflector.

TABLE 2

|  | $R_m$ | $R_s$ | X | Y | n |
|---|---|---|---|---|---|
| Optical deflector (Rotational axis) | — | — | 42.99 | 6.91 | — |
| Scanning lens 6 | 179 | −96.399 | 13.5 | 0 | First resin |
|  | −157.258 | −19.327 | 176 | 0 | — |
| Surface to be scanned | — | — | — | — | — |

In Table 2, $R_m$ represents a "paraxial curvature in the main scanning direction", whilst $R_s$ represents a "paraxial curvature in the sub-scanning direction". $D_x$ and $D_y$ (denoted as "X" and "Y" in Table 2) each represent a "relative distance from an origin of an optical element to an origin of the next optical element". All values are in millimeters. For example, as for $D_x$ and $D_y$ of the optical system components after the optical deflector, when viewed from the rotational axis of the optical deflector (polygon mirror 5), the origin of an incident surface of the scanning lens 6 (an optical axis position of the incident side surface) is 42.99 millimeters away in the optical axis direction (X direction, that is, in a horizontal direction in FIG. 2) and 6.91 millimeters away in the main scanning direction (Y direction, that is, in a vertical direction in FIG. 2). Also, the thickness of the scanning lens 6 on the optical axis is 13.5 millimeters, and a distance from the scanning lens 6 to the surface to be scanned 8 is 176 millimeters. Here, as depicted in FIG. 2, the dustproof glass G2 made of the first glass with a thickness of 1.9 millimeters is disposed between the scanning lens 6 and the surface to be scanned 8. Each surface of the scanning lens 6 is an aspheric surface, and is a special surface that is in a non-arc shape as given by Equation (1) in the main scanning direction, and has a curvature of a sub-scanning cross-section (a virtual cross-section parallel to the optical axis and the sub-scanning direction) varying according to Equation (2).

The "non-arc shape" mentioned above is as follows.

The "non-arc shape" is represented by Equation (1), where $R_m$ is a paraxial radius of curvature of a main-scanning cross-section; Y is a distance from the optical axis in the main scanning direction; K is a cone constant; $A_1, A_2, A_3, A_4, A_5, \ldots$ are higher-order coefficients; and X is a depth in the optical axis direction.

$$x = \frac{Y^2/R_m}{1+\sqrt{1-(1+K_m)\cdot(Y/R_m)^2}} + A_1 \cdot Y + A_2 \cdot Y^2 + A_3 \cdot Y^3 + A_4 \cdot Y^4 + A_5 \cdot Y^5 + A_6 \cdot Y^6 \cdots \quad (1)$$

A "change in curvature of the sub-scanning cross-section" is as follows.

An equation that represents a state in which the curvature of the sub-scanning cross-section, $C_s(Y)$ (Y is a coordinate in the main scanning direction with the optical axis position as an origin), is changed in the main scanning direction is represented as Equation (2), where $R_s(0)$ is a radius of curvature of the sub-scanning cross-section including the optical axis, and $B_1, B_2, B_3, \ldots$ are taken as coefficients.

$$C_s(Y)=1/R_s(0)+B_1\cdot Y+B_2\cdot Y^2+B_3\cdot Y^2+B_3\cdot Y^3+B_4\cdot Y^4+ B_5\cdot Y^5+B_6\cdot Y^6+ \quad (2)$$

Coefficients of the incident side surface (special surface) of the scanning lens 6 are listed in Table 3.

TABLE 3

| Coefficient in main scanning direction | | Coefficient in sub-scanning direction | |
|---|---|---|---|
| K | $-5.35584 \times 10$ | $B_1$ | 0 |
| $A_4$ | $-1.38469 \times 10^{-6}$ | $B_2$ | 0 |
| $A_6$ | $-1.57916 \times 10^{-9}$ | $B_3$ | 0 |
| $A_8$ | $3.65531 \times 10^{-12}$ | $B_4$ | 0 |
| $A_{10}$ | $-8.30685 \times 10^{-15}$ | $B_5$ | 0 |
| $A_{12}$ | $1.12844 \times 10^{-17}$ | $B_6$ | 0 |
| $A_{14}$ | $-5.98173 \times 10^{-22}$ | | |

Coefficients of the ejection side surface (special surface) of the scanning lens 6 are listed in Table 4.

TABLE 4

| Coefficient in main scanning direction | | Coefficient in sub-scanning direction | |
|---|---|---|---|
| K | 1.94524 | $B_1$ | $-2.08484 \times 10^{-5}$ |
| $A_4$ | $-9.04035 \times 10^{-7}$ | $B_2$ | $1.67626 \times 10^{-5}$ |
| $A_6$ | $-1.03608 \times 10^{-9}$ | $B_3$ | $-1.08187 \times 10^{-8}$ |
| $A_8$ | $1.32700 \times 10^{-12}$ | $B_4$ | $-1.01661 \times 10^{-8}$ |
| $A_{10}$ | $-3.07707 \times 10^{-15}$ | $B_5$ | $4.95931 \times 10^{-12}$ |
| $A_{12}$ | $3.39516 \times 10^{-18}$ | $B_6$ | $9.76946 \times 10^{-12}$ |
| $A_{14}$ | $-1.38719 \times 10^{-21}$ | | |

Figure 3:
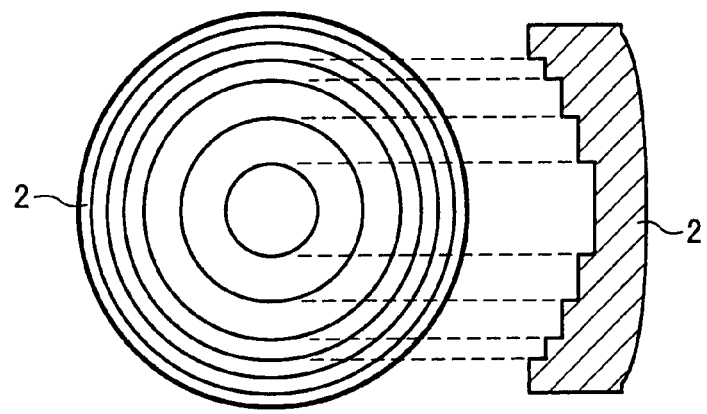
FIG. 3 depicts a front and a side view of a coupling lens shown in FIG. 2.

Next, an example is explained in which a power diffracting surface, which represents a characteristic configuration according to the first embodiment, is adopted as the coupling lens 2. The coupling lens 2 is a resin-made lens having one surface being a power diffracting surface shaped in stepwise concentric circles and the other surface being a rotation-symmetrical aspheric surface. FIG. 3 depicts a front view of the coupling lens 2 according to the first embodiment and a cross-section view thereof along a plane including the optical axis. Here, the horizontal direction in FIG. 3 represents the main scanning direction, whilst the vertical direction represents the sub-scanning direction. FIG. 3 depicts a front view of the power diffracting surface of the coupling lens 2 viewed from the optical axis direction and a cross-section view thereof with a virtual cutout end face parallel to the sub-scanning direction and the optical axis direction. One surface of the coupling lens 2 has formed thereon, as depicted in FIG. 3, a power diffracting surface shaped in concentric circles formed of a collection of stepwise grooves shaped in concentric circles. The other surface (a right side surface in FIG. 3) of the coupling lens 2 has formed thereon a refractive surface shaped in a rotation-symmetrical aspheric surface.

When entering the coupling lens 2 as the first optical element from the semiconductor laser 1 side as a light source and passing through the coupling lens 2, a light beam (a diverged light beam) is converted to a light beam having a desired cross-section shape, and is then guided to the cylindrical lens 4, which is the second optical element. For the power diffracting surface of the coupling lens 2, a power is set so that variation in beam waist position in either one or both of the main scanning direction and the sub-scanning direction due to a mode hop or a temperature change in the semiconductor laser 1 is approximately 0.

A specific configuration of the respective components forming the optical system of the optical scanning device according to the first embodiment depicted in FIG. 2 is as follows.

Light Source:

The semiconductor laser 1 as a light source has a designed light-emitting wavelength of 785 nanometers. When the temperature increases by 1 degree Celsius with respect to the normal temperature of 25 degrees Celsius, the light-emitting waveform is shifted by 0.25 nanometers to a long wavelength side. As for the mode hop, a wavelength change of 0.8 nanometers is assumed, as mentioned above.

Coupling Lens:

The coupling lens 2 is a resin-made lens having the power diffracting surface as mentioned above, and is disposed so as to have a focal length of 13.952 millimeters and a function for conversion to a weak diverged light beam. One side surface of the coupling lens 2 is aspheric. With this aspheric surface, wave aberration of the light beam converted to have a desired cross-section shape is sufficiently corrected.

The semiconductor laser 1 and the coupling lens 2 are fixedly held by a holding member made of a material with a linear expansion coefficient of $7.0 \times 10^{-5}$. The power diffracting surface of the incident surface of the coupling lens 2 is represented by $$w_{in} = C_0 \cdot r^2,$$

where $w_{in}$ is a phase function. r satisfies $$r^2 = Y^2 + Z^2,$$

where Y is a coordinate in the main scanning direction with the optical axis as an origin, Z is a coordinate in the sub-scanning direction with the optical axis as an origin, and $C_0$ is a coefficient where $C_0 = 5.693 \times 10^{-2}$. This diffracting portion is formed as a diffracting portion configuring a spherical surface with a radius of curvature of −8.783 millimeters. For this reason, the completed power diffracting surface is stepwise.

The refractive surface of the ejection surface of the coupling lens 2 is a rotation-symmetrical aspheric surface, and is in a non-arc shape given by Equation (3). That is, the rotation-symmetrical aspheric surface is represented by Equation (3), where R is a paraxial radius of curvature; H is a distance from the optical axis; K is a cone constant; $A_1, A_2, A_3, A_4, A_5, \ldots$ are higher-order coefficients; and X is a depth in the optical axis direction.

$$X = \frac{H^2/R_m}{1 + \sqrt{1 - (1 + K_m) \cdot (H/R_m)^2}} + A_1 \cdot Y + A_2 \cdot Y^2 + A_3 \cdot Y^3 + A_4 \cdot Y^4 + A_5 \cdot Y^5 + A_6 \cdot Y^6 \cdots \quad (3)$$

Coefficients of an ejection side surface of the coupling lens 2 are listed in Table 5.

TABLE 5

| | Coefficient in main scanning direction | Coefficient in sub-scanning direction | |
|---|---|---|---|
| K | $-4.13108 \times 10^{-1}$ | $B_1$ | — |
| $A_4$ | $-9.12787 \times 10^{-5}$ | $B_5$ | — |
| $A_6$ | $3.04089 \times 10^{-6}$ | $B_7$ | — |
| $A_8$ | $-9.80126 \times 10^{-7}$ | $B_9$ | — |
| $A_{10}$ | $7.71039 \times 10^{-8}$ | $B_{11}$ | — |

A specific configuration of the aperture 2 of the optical scanning device according to the first embodiment depicted in FIG. 2 is explained below. The aperture 3 has a "rectangular opening" with an opening diameter of 2.76 millimeters in the main scanning direction and an opening diameter of 2.36 millimeters in the sub-scanning direction. With the coupling lens 2, the cross-section shape of the light beam is shaped into a predetermined shape.

A specific configuration of the anamorphic optical element 4 as a second optical element of the optical scanning device according to the first embodiment depicted in FIG. 2 is explained below. The anamorphic optical element 4 is a second optical element that guides the light beam passing through the coupling lens 2, which is the first optical element, to the optical deflector, and has a linear power diffracting surface with an incident side surface being formed in a plane and an ejection side surface formed with a plane. The power diffracting surface on the incident surface is represented by $$w_{in} = C_z \cdot Z^2,$$

where $w_{in}$ is a phase function. Here, Z is a coordinate in the sub-scanning direction with the optical axis as an origin, and $C_z$ is a coefficient where $C_z = -2.5359 \times 10^{-2}$.

A specific example of the optical deflector and the sound-shielding glass G1 of the optical scanning device according to the first embodiment depicted in FIG. 2 are explained below. The polygon mirror 5 as an optical deflector has six reflective surfaces and an inradius of 13 millimeters. The sound-shielding glass G1 is made of the same material as that of the first glass, and has a thickness of 1.9 millimeters and a slope angle α in the Y direction (vertical direction in FIG. 2) of 12 degrees. Also, an angle θ formed between a progressing direction of a light beam entering from the light source side and a progressing direction of the light beam reflected from the deflection reflecting surface of the polygon mirror 5 toward a position at an image height of 0 on the surface to be scanned 8 is 68 degrees.

Variations in beam waist position in the main scanning direction and the sub-scanning direction according to the first embodiment are as in Table 6.

TABLE 6

|  | Wavelength hop [mm] | Temperature variation[mm] |
| --- | --- | --- |
| Main scanning direction | 0.36 | −0.49 |
| Sub-scanning direction | 1.52 | −1.82 |

On the other hand, if a power diffracting surface is not adopted for the coupling lens 2, variations in beam waist position are as in Table 7.

TABLE 7

|  | Wavelength hop [mm] | Temperature variation [mm] |
| --- | --- | --- |
| Main scanning direction | −6.28 | 8.76 |
| Sub-scanning direction | −5.37 | 7.64 |

As evident from comparison between Table 6 and Table 7, variations in beam waist position are reduced due to an effect of the power diffracting surface formed so that the power of the diffracting portion and the power of the refractive portion are cancelled out.

As has been explained above, according to the first embodiment, to address a problem in which variations or individual differences in laser beam diameter occur because the resin-made optical component for use in the optical scanning device is deformed due to variations in environmental temperature, a coupling lens and an anamorphic optical element disposed on an optical path are each provided with a diffracting surface and a refractive surface. With an optical design so that their lens powers are cancelled out, the diffused light and the occurrence of thickening the beam spot diameter can be prevented, thereby achieving stable scanning and exposure with an always-stable laser beam diameter.

An optical scanning device according to a second embodiment is explained in detail below. The second embodiment is different from the first embodiment in that an anamorphic optical element having a circular diffracting surface and a one-directional diffracting surface opposite thereto is provided so as to address variations in laser beam diameter and an anamorphic optical element is also provided after an fθ (f-theta) lens. The other components are similar to those of the optical scanning device according to the first embodiment. The same component are provided with the same reference numerals, and are not explained herein.

Figure 4:
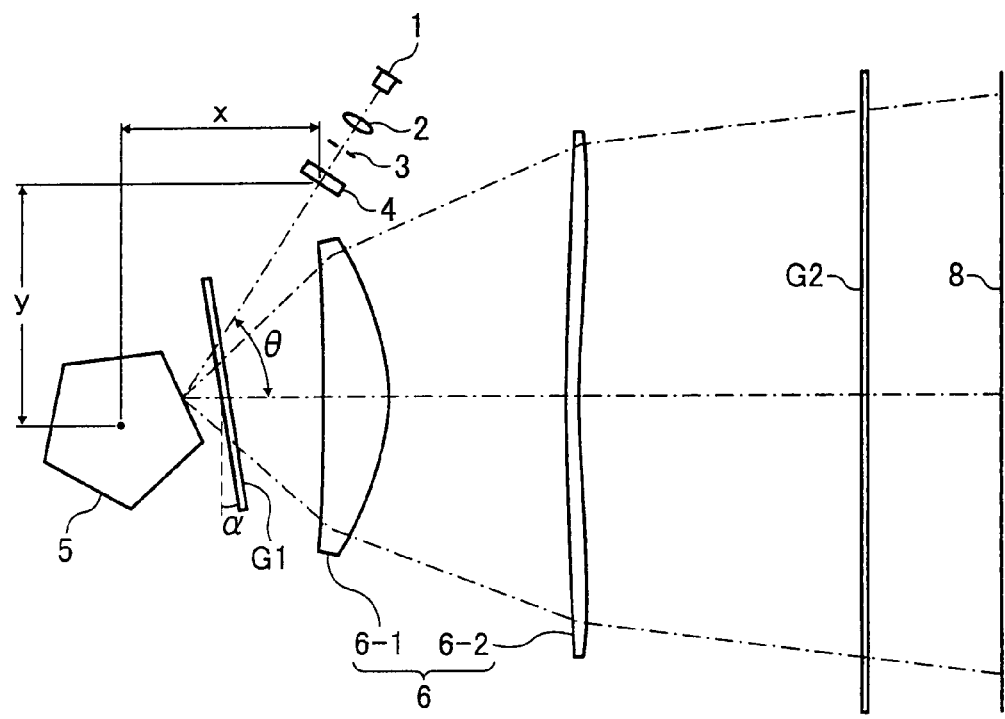
FIG. 4 depicts an arrangement of optical elements in an optical scanning device according to a second embodiment of the present invention.

FIG. 4 is a configuration diagram that depicts an arrangement of optical elements of the optical scanning device according to the second embodiment. In FIG. 4, 1 denotes a semiconductor as a light source, 2 denotes a coupling lens as a first optical element, 3 denotes an aperture, 4 denotes an anamorphic optical element as a second optical element, 5 denotes a polygon mirror, which is a rotational polygon mirror as an optical deflector, 6 denotes a scanning optical system as a third optical element, and 8 denotes a surface to be scanned. Also, G1 denotes a sound-shielding glass for shielding a window of a sound-shielding housing (not shown) that has accommodated therein the polygon mirror 5, whilst G2 denotes a dustproof glass provided at a deflected-light-beam ejecting unit of a housing having accommodating therein the optical system of the optical scanning device depicted in FIG. 4.

A diverged light beam emitted from the semiconductor laser 1 is converted by the coupling lens 2 to a light beam having a desired cross-section, is beam-shaped through the aperture 3, and then enters the anamorphic optical element 4. The light beam passing through the anamorphic optical element 4 converges in a sub-scanning direction and also passes through the sound-shielded glass G1 to form an image as a linear image elongated in the main scanning direction near a deflection reflecting surface of the polygon mirror 5. The light beam is reflected onto the deflection reflecting surface of the polygon mirror 5 to pass through the sound-shield glass G1 to enter the scanning optical system 6. The scanning optical system 6 is formed of two lenses 6-1 and 6-2. The light beam passing through these lenses 6-1 and 6-2 then passes through the dustproof glass G2 to enter the surface to be scanned 8, thereby forming a light spot on the surface to be scanned 8 by the action of the scanning optical system 6.

When the polygon mirror 5 is rotated with constant velocity, the light beam reflected from the deflection reflecting surface is deflected with constant angular velocity. The scanning optical 6 has an fθ characteristic in which the light spot due to the light beam entering as being deflected with constant angular velocity is moved with constant velocity in the main scanning direction (vertical direction in FIG. 4) on the surface to be scanned 8. The light spot optically scans the surface to be scanned 8 with constant velocity. The lenses 6-1 and 6-2 forming the scanning optical system 6 are also anamorphic optical elements and produce, in a sub-scanning direction, a geometrical-optical conjugate relation between the position of the deflection reflecting surface of the polygon mirror 5 and the position of the surface to be scanned 8. With this, a surface falling of the deflection reflecting surface of the polygon mirror 5 is corrected. The surface to be scanned 8 is substantially a photosensitive surface of a photosensitive medium (for example, a photosensitive drum).

Figure 5A:
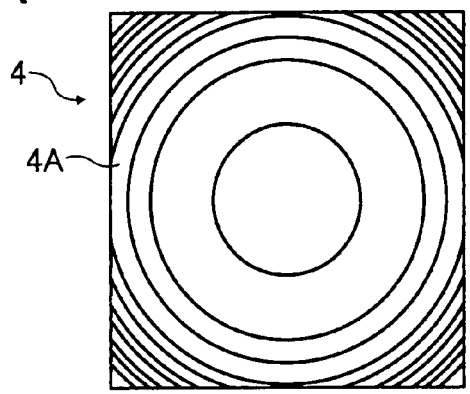
FIG. 5A is a front view of an anamorphic optical element of the optical scanning device according to the second embodiment viewed from an optical axis direction.
Figure 5B:
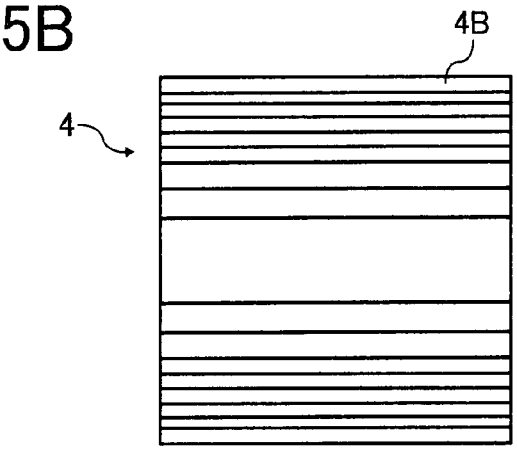
FIG. 5B is a front view of the anamorphic optical element of the optical scanning device according to the second embodiment viewed from a direction opposite to the optical axis direction.
Figure 5C:
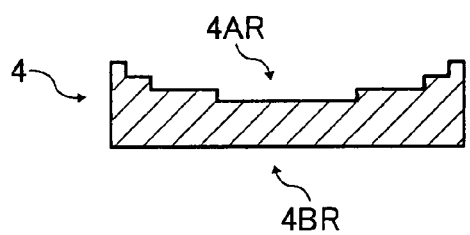
FIG. 5C is a cross-section view of the anamorphic optical element of the optical scanning device according to the second embodiment viewed from its upper surface.
Figure 5D:
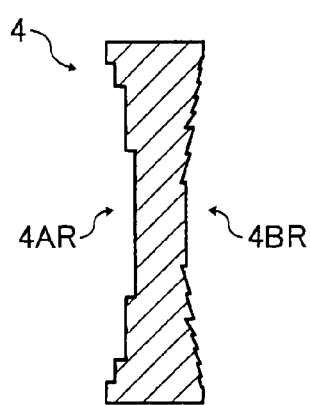
FIG. 5D is a cross-section view of the anamorphic optical element of the optical scanning device according to the second embodiment viewed from its side surface.

The anamorphic optical element 4 is a resin-made anamorphic lens having one surface being formed as a spherical surface as a power diffracting surface shaped in concentric circles and the other surface being formed as a cylindrical surface as a linear power diffracting surface. FIGS. 5A, 5B, 5C, and 5D each depict the anamorphic optical element 4, with the horizontal direction in FIG. 5 representing the main scanning direction and the vertical direction therein representing the sub-scanning direction. FIG. 5A is a front view of the anamorphic optical element 4 viewed from the optical axis direction. A surface on one side (front side) has formed thereon, as depicted in FIG. 5A, a power diffracting surface 4A shaped in concentric circles formed of a collection of grooves shaped in concentric circles. FIGS. 5C and 5D each depict a cross-section 4AR of the power diffracting surface 4A shaped in concentric circles; A surface on the other side (back surface) has formed thereon, as depicted in FIG. 5B, a linear power diffracting surface 4B formed of a collection of linear grooves. Similarly, FIGS. 5C and 5D each depict a cross-section 4BR of the linear power diffracting surface 4B formed of a collection of linear grooves.

FIG. 5C is an end view of a virtual cutout view parallel to the main scanning direction of the anamorphic optical element 4 and the optical axis direction, whilst FIG. 5D is an end view of a virtual cutout view parallel to the sub-scanning direction of the anamorphic optical element 4 and the optical axis direction. As depicted in these end views, the anamorphic optical element 4 is an anamorphic lens having one surface being formed as a spherical surface as the power diffracting surface 4A shaped in concentric circles and the other surface being formed as a cylindrical surface as the linear power diffracting surface 4B. When a light beam (a parallel light beam) entering the anamorphic optical element 4 from the light source side passes through the anamorphic optical element 4, the light beam becomes a beam parallel to the main scanning direction and converging in the sub-scanning direction. The powers of the power diffracting surfaces in the main and sub-scanning directions are set so that variation in beam waist position in either one or both of the main scanning direction and the sub-scanning direction due to a mode hop or a temperature change in the semiconductor laser 1 is approximately 0.

Next, a second configuration example of each component of the optical scanning device according to the second embodiment depicted in FIG. 4 is explained. Data on glass material (hereinafter, "second glass" and "third glass) and a resin material (hereinafter, "second resin") for use in the second embodiment and a comparison example explained further below is listed in Table 8.

TABLE 8

| | Median value | Wavelength hop | Temperature variation | Linear expansion coefficient |
|---|---|---|---|---|
| Second glass | 1.68963 | 1.68959 | 1.68953 | $7.5 \times 10^{-6}$ |
| Third glass | 1.51439 | 1.51434 | 1.51429 | $7.5 \times 10^{-6}$ |
| Second resin | 1.52726 | 1.52723 | 1.52537 | $7.0 \times 10^{-5}$ |

In Table 8, a "median value" represents a refraction index with respect to a use wavelength at a reference temperature of 25 degrees Celsius, a "wavelength hop" represents a refraction index when a wavelength hop occurs due to a mode hop, and a "temperature variation" represents a refraction index when the temperature increases from the reference temperature by 20 degrees Celsius. In the "wavelength hop" due to a mode hope, a wavelength change of 0.8 nanometers is assumed for allowance.

The respective components of the optical scanning device are as follows.

Light Source:
The semiconductor laser 1 as a light source has a designed light-emitting wavelength of 655 nanometers. When the temperature increases by 1 degree Celsius with respect to the normal temperature of 25 degrees Celsius, the light-emitting waveform is shifted by 0.2 nanometers to a long wavelength side. As for the mode hop, a wavelength change of 0.8 nanometers is assumed, as mentioned above.

Coupling Lens:
The coupling lens 2 is a glass-made lens made of the second glass material, and its principal point at front is disposed 27 millimeters away from a light-emitting unit of the semiconductor laser 1 so as to have a focal length of 27 millimeters to have a collimate operation. An aspheric surface is used for the coupling lens 2. With the aspheric surface, wave aberration of the collimated light beam is sufficiently corrected. The semiconductor laser 1 and the coupling lens 2 are fixedly held by a holding member made of a material with a linear expansion coefficient of $7.0 \times 10^{-5}$.

Aperture:
The aperture 3 has a "rectangular opening" with an opening diameter of 8.14 millimeters in the main scanning direction and an opening diameter of 2.96 millimeters in the sub-scanning direction. The aperture 3 is used for beam shaping of the light beam collimated by the coupling lens 2.

Anamorphic Optical Element:
The anamorphic optical element 4 has an incident side surface formed in a spherical surface as a power diffracting surface in concentric circles and an ejection side surface formed in a cylindrical surface as a linear power diffracting surface. The power diffracting surface on the incident surface is represented by $$w_{in} = C_0 \cdot r^2,$$

where $w_{in}$ is a phase function, and the power diffracting surface on the incident side is also represented by $$w_{out} = C_z \cdot Z^2,$$

where $w_{out}$ is a phase function. Here, r satisfies $$r^2 = Y^2 + Z^2,$$

where Y is a coordinate in the main scanning direction with the optical axis position as an origin, whilst Z is a coordinate in the sub-scanning direction with the optical axis position as an origin. $C_0$ is a coefficient where $C_0 = -2.0373 \times 10^{-3}$, whilst $C_z$ is a coefficient where $C_z = -1.5004 \times 10^{-2}$. The diffracting portion on the incident side surface is formed on a refractive portion configuring a spherical surface with a radius of curvature of −246.5 millimeters. For this reason, the completed power diffracting surface is stepwise. The diffracting portion on the ejection side surface is formed on a diffracting portion configuring a cylinder surface with radius of curvature of 69.16 millimeters.

Optical Deflector:
The polygon mirror 5 as an optical deflector has five reflective surfaces and an inradius of 18 millimeters. A distance between the ejection side surface of the anamorphic optical element 4 and the rotational axis of the polygon mirror 5 is set with a distance x=82.97 millimeters in the horizontal direction and a distance y=112.77 millimeters in the vertical direction in the arrangement depicted in FIG. 4.

The sound-shielding glass G1 is made of the second glass as the material, and has a thickness of 1.9 millimeters and a slope angle α in the Y direction (vertical direction in FIG. 4) of 16 degrees. Also, an angle θ formed between a progressing direction of a light beam entering from the light source side and a progressing direction of the light beam reflected from the deflection reflecting surface of the polygon mirror 5 toward a position at an image height of 0 on the surface to be scanned 8 is 58 degrees.

Table 9 depicts data on optical system components disposed after the optical deflector.

TABLE 9

| | $R_m$ | $R_s$ | X | Y | n |
|---|---|---|---|---|---|
| Optical deflector (Rotational axis) | — | — | 79.75 | 8.8 | — |
| Scanning optical system 6-1 | −279.88 | −61.00 | 22.6 | 0 | First resin |
| | −83.58762 | | 75.85 | 0 | — |
| Scanning optical system 6-2 | 6950 | 110.91 | 4.9 | 0 | First resin |
| | 765.95 | −68.22 | 158.71 | 0 | — |

TABLE 9-continued

| | $R_m$ | $R_s$ | X | Y | n |
|---|---|---|---|---|---|
| Surface to be scanned | — | — | — | — | — |

In this table, $R_m$ represents a "paraxial curvature in the main scanning direction", whilst $R_s$ represents a "paraxial curvature in the sub-scanning direction". $D_x$ and $D_y$ (denoted as "X" and "Y" in Table 9) each represent a relative distance from an origin of an optical element to an origin of the next optical element. All values are in millimeters. For example, as for the relative distances $D_x$ and $D_y$ of the optical system components after the optical deflector, when viewed from the rotational axis of the optical deflector (polygon mirror 5), the origin of an incident surface of the lens 6-1 (an optical axis position of the incident side surface) of the scanning optical system 6 is 79.75 millimeters away in the optical axis direction (x direction, that is, in a horizontal direction in FIG. 4) and 8.8 millimeters away in the main scanning direction (y direction, that is, in a vertical direction in FIG. 4). Also, the thickness of the lens 6-1 on the optical axis is 22.6 millimeters, a surface distance between the lenses 6-1 and 6-2 is 75.85 millimeters, the thickness of the lens 6-2 on the optical axis is 4.9 millimeters, and a distance from the lens 6-2 of the scanning optical system 6 to the surface to be scanned is 158.71 millimeters. Here, as depicted in FIG. 4, the dustproof glass G2 made of the second glass with a thickness of 1.9 millimeters is disposed between the lens 6-2 of the scanning optical system 6 and the surface to be scanned.

Each surface of the lenses 6-1 and 6-2 of the scanning optical system 6 is an aspheric surface. The incident side surface of the lens 6-1 and the incident side surface and ejection side surface of the lens 6-2 are special surfaces that are each in a non-arc shape as given by the equation (1) in the main scanning direction and has a curvature of a sub-scanning cross-section (a virtual cross-section parallel to the optical axis and the sub-scanning direction) varying according to the equation (2). Also, the ejection side surface of the lens 6-1 is a rotation-symmetrical aspheric surface represented by the equation (3).

Coefficients of the incident side surface (special surface) of the lens 6-1 are listed in Table 10.

TABLE 10

| Coefficient in main scanning direction | | Coefficient in sub-scanning direction | |
|---|---|---|---|
| K | $-2.900 \times 10$ | $B_1$ | $-2.066 \times 10^{-6}$ |
| $A_1$ | 0 | $B_2$ | $5.728 \times 10^{-6}$ |
| $A_2$ | 0 | $B_3$ | $3.152 \times 10^{-8}$ |
| $A_3$ | 0 | $B_4$ | $2.280 \times 10^{-9}$ |
| $A_4$ | $1.756 \times 10^{-7}$ | $B_5$ | $-3.730 \times 10^{-11}$ |
| $A_5$ | 0 | $B_6$ | $-3.283 \times 10^{-12}$ |
| $A_6$ | $-5.492 \times 10^{-11}$ | $B_7$ | $1.766 \times 10^{-14}$ |
| $A_7$ | 0 | $B_8$ | $1.373 \times 10^{-15}$ |
| $A_8$ | $1.088 \times 10^{-14}$ | $B_9$ | $-2.890 \times 10^{-18}$ |
| $A_9$ | 0 | $B_{10}$ | $-1.985 \times 10^{-19}$ |
| $A_{10}$ | $-3.183 \times 10^{-19}$ | $B_{11}$ | 0 |
| $A_{11}$ | 0 | $B_{12}$ | 0 |
| $A_{12}$ | $-2.635 \times 10^{-24}$ | $B_{13}$ | 0 |

Coefficients of the ejection side surface (rotation-symmetrical aspheric surface) of the lens 6-1 are listed in Table 11.

TABLE 11

| | Coefficient in main scanning direction | | Coefficient in sub-scanning direction |
|---|---|---|---|
| K | $-0.549$ | $B_1$ | — |
| $A_1$ | 0 | $B_2$ | — |
| $A_2$ | 0 | $B_3$ | — |
| $A_3$ | 0 | $B_4$ | — |
| $A_4$ | $2.748 \times 10^{-7}$ | $B_5$ | — |
| $A_5$ | 0 | $B_6$ | — |
| $A_6$ | $-4.502 \times 10^{-12}$ | $B_7$ | — |
| $A_7$ | 0 | $B_8$ | — |
| $A_8$ | $-7.366 \times 10^{-15}$ | $B_9$ | — |
| $A_9$ | 0 | $B_{10}$ | — |
| $A_{10}$ | $1.803 \times 10^{-18}$ | $B_{11}$ | — |
| $A_{11}$ | 0 | $B_{12}$ | — |
| $A_{12}$ | $2.728 \times 10^{-23}$ | $B_{13}$ | — |

Coefficients of the incident side surface (special surface) of the lens 6-2 are listed in Table 12.

TABLE 12

| | Coefficient in main scanning direction | | Coefficient in sub-scanning direction |
|---|---|---|---|
| K | 0 | $B_1$ | $-9.594 \times 10^{-7}$ |
| $A_1$ | 0 | $B_2$ | $-2.135 \times 10^{-7}$ |
| $A_2$ | 0 | $B_3$ | $-8.080 \times 10^{-12}$ |
| $A_3$ | 0 | $B_4$ | $2.391 \times 10^{-12}$ |
| $A_4$ | $1.550 \times 10^{-8}$ | $B_5$ | $2.881 \times 10^{-14}$ |
| $A_5$ | 0 | $B_6$ | $3.694 \times 10^{-15}$ |
| $A_6$ | $1.293 \times 10^{-14}$ | $B_7$ | $-3.259 \times 10^{-18}$ |
| $A_7$ | 0 | $B_8$ | $1.814 \times 10^{-20}$ |
| $A_8$ | $-8.811 \times 10^{-18}$ | $B_9$ | $8.722 \times 10^{-23}$ |
| $A_9$ | 0 | $B_{10}$ | $-1.341 \times 10^{-23}$ |
| $A_{10}$ | $-9.182 \times 10^{-22}$ | $B_{11}$ | 0 |

Coefficients of the ejection side surface (special surface) of the lens 6-2 are listed in Table 13.

TABLE 13

| | Coefficient in main scanning direction | | Coefficient in sub-scanning direction |
|---|---|---|---|
| K | 5.790 | $B_1$ | 0 |
| $A_1$ | 0 | $B_2$ | $3.644 \times 10^{-7}$ |
| $A_2$ | 0 | $B_3$ | 0 |
| $A_3$ | 0 | $B_4$ | $-4.847 \times 10^{-13}$ |
| $A_4$ | $-1.150 \times 10^{-7}$ | $B_5$ | 0 |
| $A_5$ | 0 | $B_6$ | $-1.666 \times 0^{-16}$ |
| $A_6$ | $1.097 \times 10^{-11}$ | $B_7$ | 0 |
| $A_7$ | 0 | $B_8$ | $4.535 \times 10^{-19}$ |
| 0 | $-6.542 \times 10^{-16}$ | $B_9$ | 0 |
| $A_9$ | 0 | $B_{10}$ | $-2.819 \times 10^{-23}$ |
| $A_{10}$ | $1.984 \times 10^{-20}$ | $B_{11}$ | 0 |
| $A_{11}$ | 0 | $B_{12}$ | 0 |
| $A_{12}$ | $-2.412 \times 10^{-25}$ | $B_{13}$ | 0 |

Figure 6A:
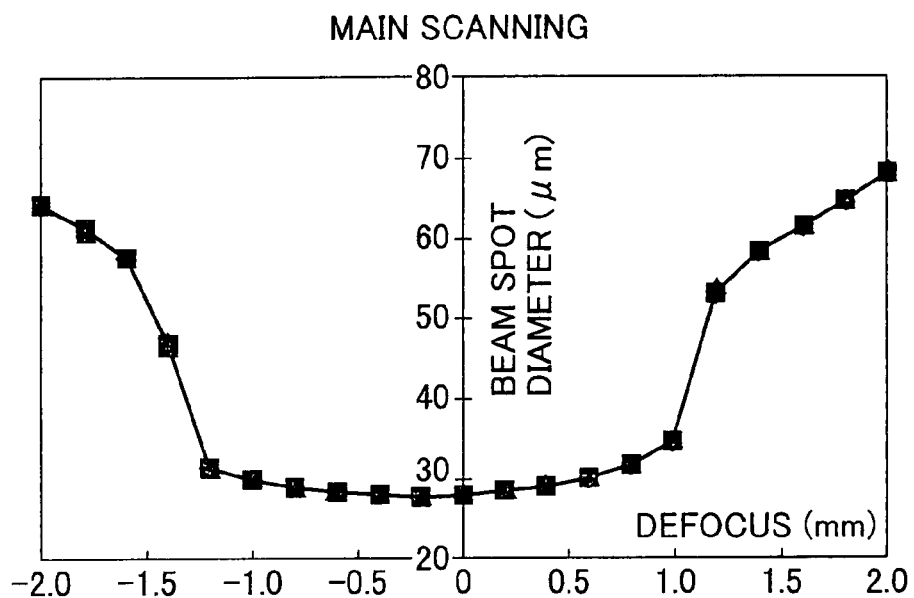
FIG. 6A is a graph depicting a relation between a defocus and a beam spot diameter in a main scanning direction of the optical scanning device according to the second embodiment.
Figure 6B:
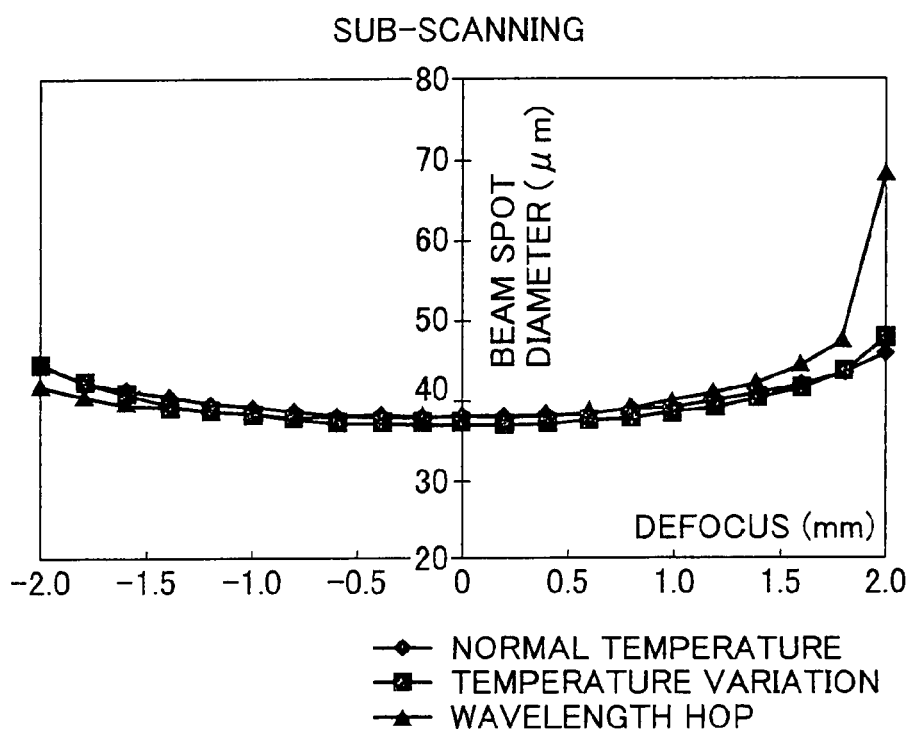
FIG. 6B is a graph depicting a relation between a defocus and a beam spot diameter in a sub-scanning direction of the optical scanning device according to the second embodiment.

A relation between the beam spot diameter in the main scanning direction according to the second embodiment and defocus of the beam waist position with respect to the surface to be scanned is depicted in FIG. 6A, whilst a relation between the beam spot diameter in the sub-scanning direction according to the second embodiment and defocus of the beam waist position with respect to the surface to be scanned is depicted in FIG. 6B. In each of these drawings, a relation at the time of a reference temperature of 25 degrees Celsius (hereinafter, "normal temperature") and a relation with an increase in temperature by 20 degrees Celsius with respect to the normal temperature, ("temperature variation"), and a relation when the light-emitting wavelength is changed by 0.8 nanometers ("wavelength hop") are depicted.

FIG. 6A depicts a beam spot diameter in the main scanning direction, whilst FIG. 6B depicts a beam spot diameter in the sub-scanning direction, with an image height of a light spot of 0 in both cases. As evident from FIGS. 6A and 6B, in the optical scanning device according to the second embodiment, the relation between the beam spot diameter and the defocus amount is substantially not changed in both of the main and sub-scanning directions in any of a normal temperature state, a temperature varying state, and a wavelength hop state. This means that the beam waist position in the main and sub-scanning directions is substantially not changed irrespectively of temperature variations or a mode hop.

Next, the case is considered in which the power diffracting surface according to the first or second embodiment has a process error. For example, a groove distance of the power diffracting surface formed on the spherical surface, shaped in concentric circles, and adopted on the incident surface side of the anamorphic optical element according to the second embodiment is gradually shortened as the groove distance is further away from the optical axis. This groove distance is on the order of 100 micrometers at minimum in the second embodiment. It is assumed herein that the groove distance has one of process errors of 2 micrometers, 4 micrometers, and 6 micrometers. Such an process error significantly varies the power of the anamorphic optical element. If such anamorphic optical element with a process error is mounted as it is on the optical scanning device, the light-gathering point of light beams is significantly shifted from the surface to be scanned 8, thereby increasing the beam spot. If such an optical scanning device is developed to, in particular, a color optical printer, color reproducibility is deteriorated and gray scale is lost. However, since the amount of such a shift of the light-gathering point of light beams is approximately equal over the entire image height, the shift can be absorbed if this anamorphic optical element is moved in the optical axis direction.

Figure 7:
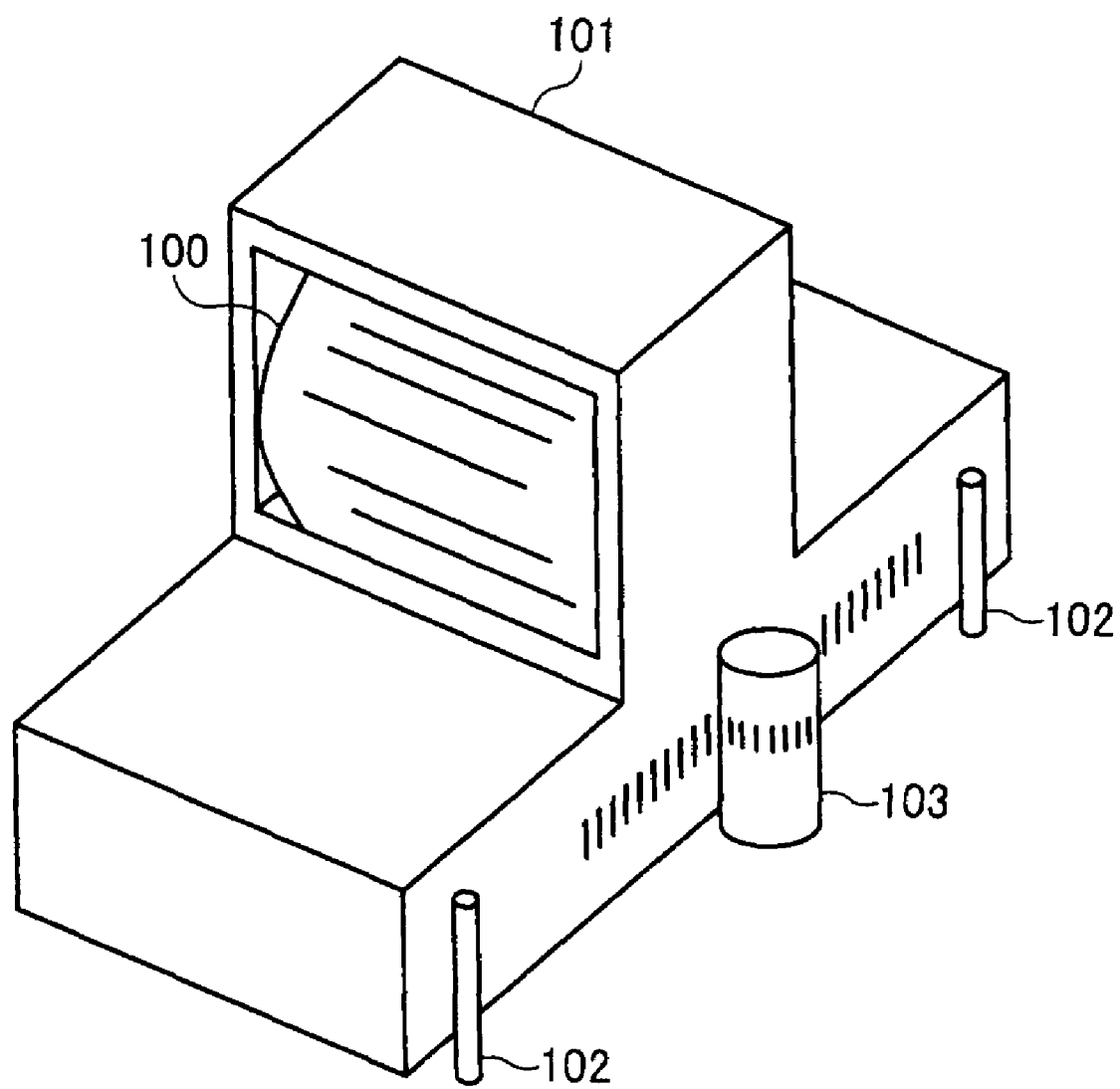
FIG. 7 is a schematic diagram of an adjusting mechanism for absorbing a light-gathering point shift of light beams in the optical scanning device according to the second embodiment.

FIG. 7 is a schematic diagram of an adjusting mechanism for absorbing a light-gathering point shift of the light beams in the optical scanning device according to the second embodiment. In FIG. 7, 100 denotes an anamorphic optical element, and 101 denotes a holder that fixes the anamorphic optical element. The holder 101 is positioned as being pressed by the force of a spring not shown onto a stop reference pin 102 and a gear 103 provided on a housing. The holder 101 has a side surface provided with a rack-shaped gear at a portion in contact with the gear 103. This rack-shaped gear is engaged with the gear 103. Therefore, when the gear 103 is rotated, the holder 102 accordingly operates along the optical axis direction. With such a configuration, the anamorphic optical element can be moved in the optical axis direction. Therefore, even if the power diffracting surface provided to the anamorphic optical element has a process error, a desired beam spot can be formed on the surface to be scanned. As a matter of course, provision of such a mechanical system is not imperative. In one scheme, when the anamorphic optical element is fixed to the optical scanning device, the anamorphic optical element is adjusted in position and is fixed with an adhesive. With this, no adjusting mechanism is required, and a component unnecessary after adjustment is prevented from remaining in the optical scanning device.

Figure 8A:
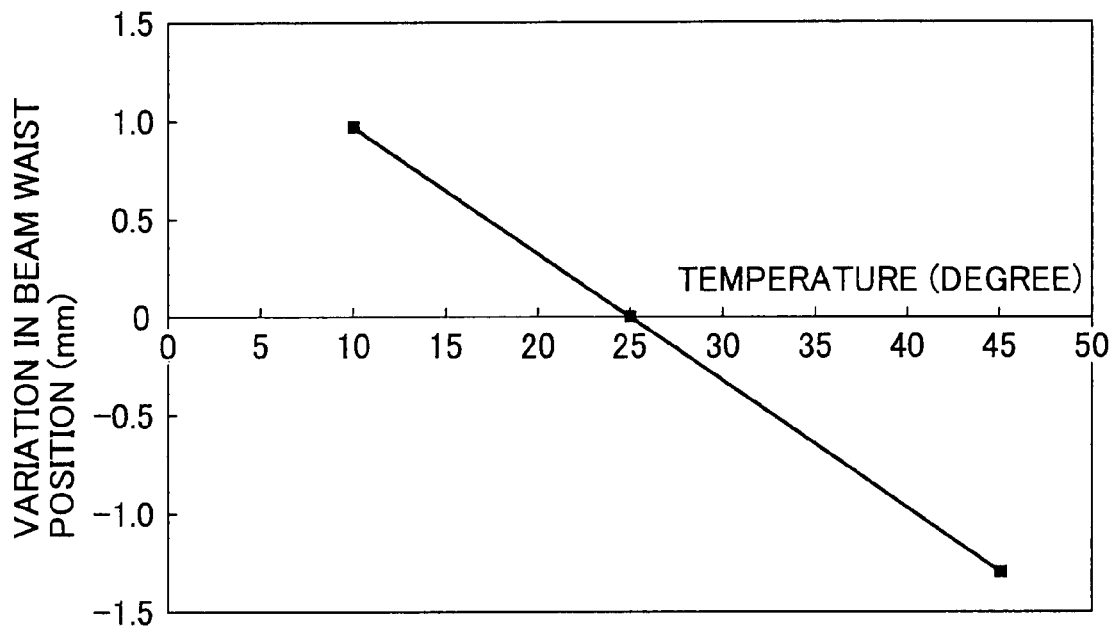
FIG. 8A is a first graph depicting focus distance variations when an atmospheric temperature of the anamorphic optical element according to the second embodiment is changed.
Figure 8B:
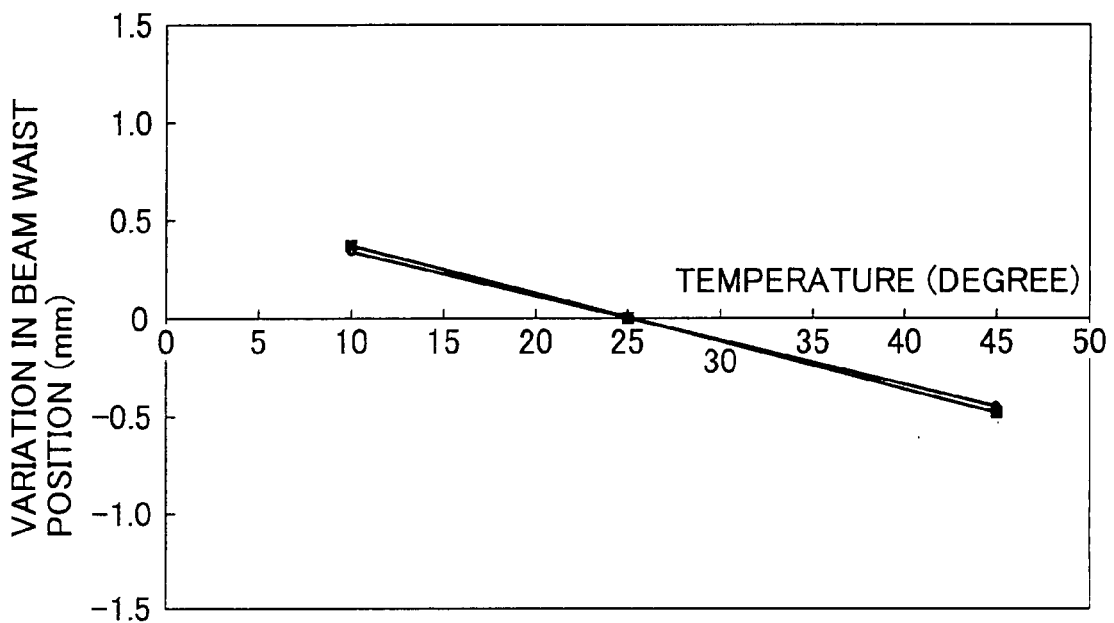
FIG. 8B is a second graph depicting focus distance variations when the atmospheric temperature of the anamorphic optical element according to the second embodiment is changed.

Here, as a premise of this scheme, a desired diffracting effect has to be achieved even with a process error in the anamorphic optical element. However, even if a process error of any one of 2 micrometers, 4 micrometers, and 6 micrometers is present in the groove distance, a diffracting effect with exactly the same value as the designed median value can be expected. FIGS. 8A and 8B are graphs depicting focus distance variations when an atmospheric temperature of the anamorphic optical element according to the second embodiment is changed. FIGS. 8A and 8B depict that focus distance variations of the anamorphic optical element are exactly the same when the atmospheric temperature of the anamorphic optical element is changed from a temperature of 25 degrees Celsius to 10 degrees Celsius and 45 degrees Celsius.

As has been explained above, according to the second embodiment, an anamorphic optical element having one surface as a circular diffracting surface and an opposite surface as a one-directional diffracting surface is disposed on an optical path before polygon mirror reflection, and another anamorphic optical element for correction only in the main scanning direction is disposed on the optical path after an fθ lens. With this, the occurrence of the diffused light and thickening the beam spot diameter can be prevented, thereby achieving stable scanning and exposure with an always-stable laser beam diameter.

An optical scanning device according to a third embodiment is explained in detail below. The third embodiment is different from the first embodiment in that lens specifications of the coupling lens are defined in detail. The other components are similar to those of the optical scanning device according to the first embodiment. The same component are provided with the same reference numerals, and are not explained herein. A schematic configuration of an optical system of the optical scanning device according to the third embodiment is similar to that in FIG. 2 explained in the first embodiment.

The specifications of the coupling lens are explained in detail below.

The coupling lens 2 is a resin-made lens having one surface being a power diffracting surface shaped in stepwise concentric circles and the other surface being a rotation-symmetrical aspheric surface.

Figure 9A:
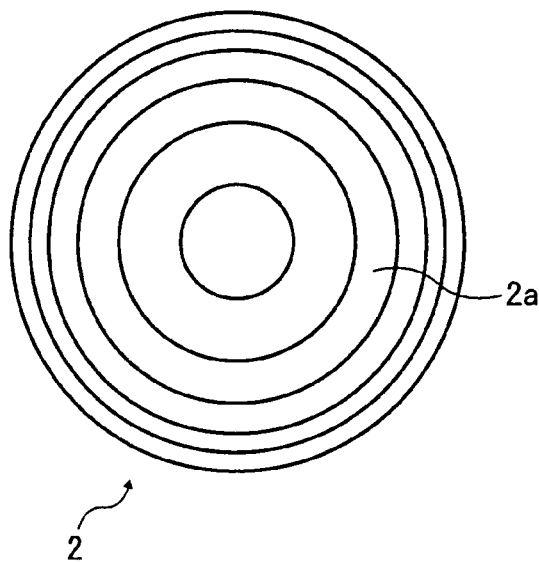
FIG. 9A is a front view of a coupling lens according to a third embodiment viewed from an optical axis direction.
Figure 9B:
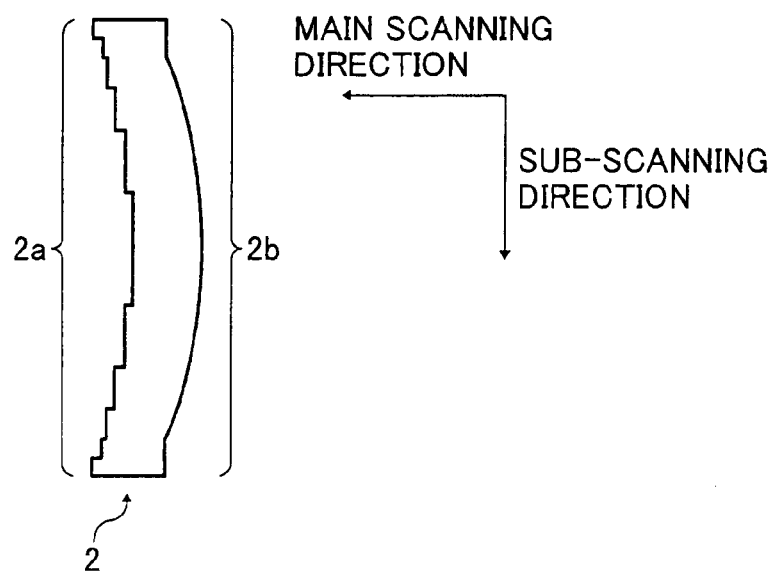
FIG. 9B is a cross-section view of the coupling lens according to the third embodiment viewed from its side surface.

FIG. 9A is a front view of the coupling lens 2 according to the third embodiment viewed from an optical axis direction. FIG. 9B is a cross-section view of the coupling lens 2 according to the third embodiment. The horizontal direction represents a main scanning direction, whilst the vertical direction represents the sub-scanning direction.

In FIGS. 9A and 9B, one surface 2a of the coupling lens 2 has formed thereon a power diffracting surface shaped in concentric circles formed of a collection of stepwise grooves shaped in concentric circles. The other surface 2b has formed thereon a refractive surface in a rotation-symmetrical aspheric shape.

When entering the coupling lens 2 from the semiconductor laser 1 and passing through the coupling lens 2, a light beam (a diverged light beam) is converted to a light beam having a desired cross-section shape, and is then guided to the anamorphic optical element 4, which is the second optical element (second optical system). A power of the power diffracting surface of the coupling lens 2 is set so that variation in beam waist position in either one or both of the main scanning direction and the sub-scanning direction due to a temperature change or a mode hop in the semiconductor laser 1 is approximately 0.

As such, the coupling lens 2 has one surface as the diffracting surface 2a and the other surface as the refractive surface 2b. As for the diffracting surface 2a, optical use efficiency is inevitably decreased with a process error due to wavelength variations of the light source. Thus, with the diffracting surface 2a being adopted only for one surface (Condition (4)), optical use efficiency can be improved. Furthermore, the power of the diffracting surface 2a of the coupling lens 2 satisfies the following conditional equations (5) to (7).

$$|P3| \geq |P1+P2| \tag{5}$$

$$|P1| > |P1+P1| \text{ and } |P2| > |P1+P2| \tag{6}$$

$$P1 \times P3 > 0 \rightarrow \text{temperature correction effect} \tag{7}$$

where P1 is a power in the main scanning direction or the sub-scanning direction of the diffracting portion of the diffracting surface of the resin-made lens, P2 is a power of the refractive portion of the diffracting surface in the direction defined in P1, and P3 is a power of another surface of the resin-made lens other than the diffracting surface in the direction defined in P1.

Here, the conditional equation (6) represents that the power of the diffracting portion of the diffracting surface 2a and the power of the refractive portion thereof are set so as to be cancelled out. |P1|>|P1+P1| represents that the absolute value of the power of the diffracting portion is canceled out by adding the power of the refractive portion. |P1|>|P1+P1| represents that the absolute value of the power of the refractive portion is canceled out by adding the power of the diffracting portion. At this time, the power of the diffracting surface 2a is decreased as a whole.

Furthermore, in the conditional equation (5), with |P3|≧|P1+P1| being satisfied, the power of the entire surface can be distributed over the refractive portion, thereby achieving an optical element resistant to eccentricity between surfaces.

Still further, with the conditional equation (6) being satisfied, although the power of the diffracting surface 2a is decreased, the diffracting surface shape becomes more similar to a stepwise shape. Although the most ideal shape is a stepwise shape, only with the equation (6) being satisfied, a forming scheme can be adopted without causing process residues, such as those in shaper processing. With this, processing time can be also be reduced. From such a reduction in processing time, secondary merits are derived, such as a reduction in the occurrence of heat at the time of processing, which are preferable to obtain the diffracting surface 2a with high accuracy. With profile irregularities of the diffracting surface 2a being smoothly completed, the occurrence of diffused light and thickening the beam spot diameter can be almost completely prevented.

The conditional equation (7) represents that the sign of the power of the refractive portion and that of the diffracting portion are made identical to each other.

Normally, the refractive lens with a positive power is changed as follows with increase in temperature.

The radius of curvature is increased due to expansion;

The refractive index is decreased; and

The wavelength of the semiconductor laser is increased.

All of these changes act in a direction of increasing the focus distance of the refractive lens. On the other hand, as for the diffracting portion having a positive power, the focus distance is shortened as the wavelength is increased. Therefore, if the signs of the refractive portion and the diffracting portion are identical to each other, variations in focus distance are cancelled out at the time of an increase in temperature, and variations in focus distance can be reduced as a whole. When the temperature is decreased, the focus distances of the refractive portion and the diffracting portion are varied in a direction opposite to the direction when the temperature is increased, and variations in focus distance can also be reduced as a whole.

In general, the coupling lens 2 as the first optical element (first optical system) requires a function of converting diverged light beams to a light beam with a desired cross section, and has to have a positive power in either one or both of the main scanning direction and the sub-scanning direction. The anamorphic optical element 4 as the second optical element (second optical system) requires formation of a light beams from the first optical system as a linear image elongated in the main scanning direction near a deflection reflecting surface of the optical deflector (polygon mirror 5) and, to do this, has to have a positive power at least in the sub-scanning direction. That is, to achieve not only temperature compensation but also a coupling function or a linear-image forming function, P1+P1+P3 as the entire power has to be a positive power. Here, if P3>0, according to the conditional equation (5), it can be satisfied that P1+P1+P3 is a positive power.

As has been explained above, with the power diffracting surface being provided to the first optical system or the second optical system, variations in beam waist position due to temperature can be reduced as a single element. If the temperature correcting effect as a single element being made excessive, temperature compensation in the entire optical scanning device can be achieved. Therefore, with a resin-made lens having a positive power in at least one of the main scanning direction and the sub-scanning directions being provided to the scanning lens 6 as the third optical element (third optical system), low cost and light weight can be achieved. Also, with the conditional equation (4) and the equations (5) to (7) be satisfied, the beam spot diameter can be reduced.

Furthermore, the resin-made scanning lens can be easily adopted for an aspheric surface and a free surface. As initial characteristics, excellent optical characteristics including a small beam spot diameter can be ensured. With such configuration of each component according to the third embodiment, optical characteristics including temperature characteristics, which have been solely problematic, can be improved.

As has been explained, the power of the entire surface is distributed over the refractive portion of the refractive surface 2b, thereby making an optical element resistant to eccentricity between surfaces. However, what is most desirable is that the power of the diffracting surface 2a is 0, specifically, P1=−P1. With this, it is possible to provide an optical scanning device with less deterioration in beam spot diameter even if the diffracting surface 2a is eccentric with respect to the refractive surface 2b.

Also, if the diffracting surface 2 has a stepwise configuration, a forming scheme can be adopted without causing process residues, such as those in shaper processing. With this, processing time can be also be reduced. From such a reduction in processing time, secondary merits are derived, such as a reduction in the occurrence of heat at the time of processing, which are preferable to obtain the power diffracting surface 2a with high accuracy.

The power of the lens itself is given by a combination of the powers of the incident surface and the outgoing surface. Even with non-power on one surface, by appropriately adjusting the power on the opposite side, a desired lens power can be achieved. Therefore, the stepwise power diffracting surface can be adopted for lenses of any power.

As a matter of course, the profile irregularities can be completed extremely smoothly since non-planar portion is not present even locally. Also, diffused light or thickening the beam spot diameter can hardly occur.

The coupling lens 2 as the first optical system is an optical system for converting diffused light beams from the semiconductor laser 1 to a light beam having a desired cross-section.

Normally, the optical element included in the first optical system has to be adjusted in either one, two, or all of the main scanning direction, the sub-scanning direction, and the optical axis direction. If such an accurate adjustment is required, the optical element may possibly be rotated around the optical axis during adjustment. When the anamorphic surface is rotated around the optical axis, the beam spot diameter is deteriorated. Therefore, the surface is preferably a rotation-symmetrical surface as possible. Also, the entire power of the diffracting surface in the first optical system is preferably decreased as possible, and what is most desirable is that the power of the diffracting surface is 0. Therefore, to correct wave aberration, the refractive surface 2b opposite to the diffracting surface is formed as a rotation-symmetrical aspheric surface.

A third specific configuration example of the optical scanning device according to the third embodiment is explained in detail below.

Data on a glass material (hereinafter, "fourth glass") and a resin material (hereinafter, "third resin") for use in the third embodiment is listed in Table 14.

TABLE 14

Material data

| | Median value | Wavelength hop | Temperature variation | Linear expansion coefficient |
|---|---|---|---|---|
| Fourth glass | 1.511084 | 1.511068 | 1.511027 | $7.5 \times 10^{-6}$ |
| Third resin | 1.523867 | 1.523852 | 1.522026 | $7.0 \times 10^{-5}$ |

In Table 14, a "median value" represents a refraction index with respect to a use wavelength at a reference temperature of 25 degrees Celsius, a "wavelength hop" represents a refraction index when a wavelength hop occurs due to a mode hop, and a "temperature variation" represents a refraction index when the temperature increases from the reference temperature by 20 degrees Celsius. In the "wavelength hop" due to a mode hope, a wavelength change of 0.8 nanometers is assumed for allowance.

Table 15 depicts data on optical system components disposed after the polygon mirror (optical deflector) 5 having the optical system configuration as depicted in FIG. 2.

TABLE 15

Optical system data after optical deflector

| | $R_m$ | $R_s$ | Dx | Dy | n |
|---|---|---|---|---|---|
| Polygon mirror (Rotational axis) 5 | — | — | 42.99 | 6.91 | — |
| Scanning lens 6 | 179 | −96.399 | 13.5 | 0 | First resin |
| | −157.258 | −19.327 | 176 | 0 | — |
| Surface to be scanned 8 | — | — | — | — | — |

In Table 15, $R_m$ represents a "paraxial curvature in the main scanning direction", whilst $R_s$ represents a "paraxial curvature in the sub-scanning direction". $D_x$ and $D_y$ each represent "a relative distance from an origin of an optical element to an origin of the next optical element". All values are in millimeters.

For example, as for $D_x$ and $D_y$, with respect to the polygon mirror 5, when viewed from the rotational axis of the polygon mirror 5, the origin of an incident surface of the scanning lens 6 (an optical axis position of the incident side surface) is 42.99 millimeters away in the optical axis direction (x direction, that is, in a horizontal direction in FIG. 2) and 6.91 millimeters away in the main scanning direction (y direction, that is, in a vertical direction in FIG. 2).

Also, the thickness of the scanning lens 6 on the optical axis is 13.5 millimeters and a distance from the scanning lens 6 to the surface to be scanned 8 is 176 millimeters. Here, as depicted in FIG. 2, the dustproof glass G2 made of the third glass with a thickness of 1.9 millimeters is disposed between the scanning lens 6 and the surface to be scanned 8.

Each surface of the scanning lens 6 is aspheric, and is a special surface in a non-arc shape with the condition (4) in the main scanning direction and has a curvature of the sub-scanning cross-section (a virtual cross-section parallel to the optical axis and the sub-scanning direction) varying according to the conditional equation (5) in the main scanning direction.

Non-Arc Shape:

The non-arc shape is represented by Equation (8), where $R_m$ is a paraxial radius of curvature of a main-scanning cross-section; Y is a distance from the optical axis in the main scanning direction; K is a cone constant; $A_1, A_2, A_3, A_4, A_5, \ldots$ are higher-order coefficients; and X is a depth in the optical axis direction.

$$X = \frac{Y^2/R_m}{1+\sqrt{1-(1+K_m)\cdot(Y/R_m)^2}} + A_1 \cdot Y + A_2 \cdot Y^2 + A_3 \cdot Y^3 + A_4 \cdot Y^4 + A_5 \cdot Y^5 + A_6 \cdot Y^6 \ldots \quad (8)$$

Changes in curvature in the sub-scanning cross-section:

An equation that represents a state in which the curvature of the sub-scanning cross-section, $C_s(Y)$ (Y is a coordinate in the main scanning direction with the optical axis position as an origin), is changed in the main scanning direction is represented as Equation (9), where $R_s(0)$ is a radius of curvature of the sub-scanning cross-section including the optical axis, and $B_1, B_2, B_3, \ldots$ are taken as coefficients.

$$C_s(Y) = \frac{1}{R_s(0)} + B_1 \cdot Y + B_2 \cdot Y^2 + B_3 \cdot Y^3 + B_4 \cdot Y^4 + B_5 \cdot Y^5 + B_6 \cdot Y^6 + \cdots \quad (9)$$

Coefficients of the incident side surface (special surface) of the scanning lens 6 are listed in Table 16.

TABLE 16

| | Coefficient in main scanning direction | | Coefficient in sub-scanning direction |
|---|---|---|---|
| K | $-5.35584 \times 10$ | $B_1$ | 0 |
| $A_4$ | $-1.38469 \times 10^{-6}$ | $B_2$ | 0 |
| $A_6$ | $-1.57916 \times 10^{-9}$ | $B_3$ | 0 |
| $A_8$ | $3.65531 \times 10^{-12}$ | $B_4$ | 0 |
| $A_{10}$ | $-8.30685 \times 10^{-15}$ | $B_5$ | 0 |
| $A_{12}$ | $1.12844 \times 10^{-17}$ | $B_6$ | 0 |
| $A_{14}$ | $-5.98173 \times 10^{-22}$ | | |

Coefficients of the ejection side surface (coaxial aspheric surface) of the scanning lens 6 are listed in Table 17.

TABLE 17

| Coefficient in main scanning direction | | Coefficient in sub-scanning direction | |
|---|---|---|---|
| K | 1.94524 | $B_1$ | $-2.08484 \times 10^{-5}$ |
| $A_4$ | $-9.04035 \times 10^{-7}$ | $B_2$ | $1.67626 \times 10^{-5}$ |
| $A_6$ | $-1.03608 \times 10^{-9}$ | $B_3$ | $-1.08187 \times 10^{-8}$ |
| $A_8$ | $1.32700 \times 10^{-12}$ | $B_4$ | $-1.01661 \times 10^{-8}$ |
| $A_{10}$ | $-3.07707 \times 10^{-15}$ | $B_5$ | $4.95931 \times 10^{-12}$ |
| $A_{12}$ | $3.39516 \times 10^{-18}$ | $B_6$ | $9.76946 \times 10^{-12}$ |
| $A_{14}$ | $-1.38719 \times 10^{-21}$ | | |

As an optical element, the one configured as explained with reference to FIG. 2 is formed. The power of the diffracting surface 2a is set so that variations in beam waist position in either one of the main scanning direction and the sub-scanning direction due to a mode hop or a temperature change in the semiconductor laser 1.

Each component of the optical system according to the third embodiment is configured as explained above. Here, the optical elements of the optical system before the polygon mirror 5 are appropriately arranged so that the image formation position in the main scanning and sub-scanning of the entire optical system is near the surface to be scanned 8.

Light Source:

The semiconductor laser 1 as a light source has a designed light-emitting wavelength of 785 nanometers. When the temperature increases by 1 degree Celsius with respect to the normal temperature of 25 degrees Celsius, the light-emitting waveform is shifted by 0.25 nanometers to a long wavelength side. As for the mode hop, a wavelength change of 0.8 nanometers is assumed, as mentioned above.

Coupling Lens:

The coupling lens 2 is a resin-made lens having the power diffracting surface as mentioned above, and is disposed so as to have a focal length of 12.5 millimeters and a function for conversion to a weak diverged light beam. One side surface of the coupling lens 2 is aspheric. With this aspheric surface, wave aberration of the light beam converted to have a desired cross-section shape is sufficiently corrected.

The semiconductor laser 1 and the coupling lens 2 are fixedly held by a holding member made of a material with a linear expansion coefficient of $2.3 \times 10^{-5}$, such as aluminum.

The power diffracting surface of the incident surface is represented by $$w_{in} = C_0 \cdot r_2,$$

where $w_{in}$ is a phase function r satisfies $$r^2 = Y^2 + Z_2,$$

where Y is a coordinate in the main scanning direction with the optical axis as an origin, Z is a coordinate in the sub-scanning direction with the optical axis as an origin, and $C_0$ is a coefficient that satisfies $C_0 = 5.415 \times 10^{-2}$. This, diffracting portion 2a is formed on a refractive portion configuring a spherical surface with a radius of curvature of −9.234 millimeters. At this time, P1=−P1, and the formed diffracting surface is stepwise. That is, the power of the first surface is non-power.

The refractive surface 2b of the ejection surface is a rotation-symmetrical aspheric surface, and is in a non-arc shape given by the condition (4).

Rotation-Symmetrical Aspheric Surface:

The rotation-symmetrical aspheric surface is represented by Equation (10), where R is a paraxial radius of curvature; H is a distance from the optical axis; K is a cone constant; $A_1$, $A_2$, $A_3$, $A_4$, $A_5$, ... are higher-order coefficients; and X is a depth in the optical axis direction.

$$X = \frac{H^2/R_m}{1 + \sqrt{1-(1+K_m)\cdot(H/R_m)^2}} + A_1 \cdot Y + A_2 \cdot Y^2 + A_3 \cdot Y^3 + A_4 \cdot Y^4 + A_5 \cdot Y^5 + A_6 \cdot Y^6 \cdots \quad (10)$$

Coefficients of the ejection side surface of the coupling lens 2 are listed below.

$K_m = -4.293 \times 10^{-1}$, $R_m = -9.232$, $A_1 = A_2 = A_3 = 0$, $A_4 = -1.896 \times 10^{-4}$, $A_6 = 4.258 \times 10^{-6}$, $A_8 = -2.347 \times 10^{-6}$, $A_{10} = 2.269 \times 10^{-7}$ Aperture:

The aperture 3 has a rectangular opening with an opening diameter of 2.76 millimeters in the main scanning direction and an opening diameter of 2.36 millimeters in the sub-scanning direction. With the coupling lens 2, beam shaping is performed so that the light beam has a desired cross-section.

Anamorphic Optical Element:

The anamorphic optical element 4 has an incident side surface formed in a cylindrical surface having a power only in the sub-scanning direction and an ejection side surface formed as a stepwise diffracting surface with the sub-scanning cross-section being the same irrespectively of the position in the main scanning direction.

The radius of curvature of the incident surface in the sub-scanning direction is 19.723 millimeters. The diffracting surface on the incident surface is represented by Equation (11)

$$w = C_Z \cdot Z^2 \quad (11)$$

where w is a phase function and $C_Z$ is a coefficient that satisfies $C_Z = -2.82 \times 10^{-2}$.

This diffracting surface is formed on a refractive portion configuring a cylindrical surface with a radius of curvature of 17.675 millimeters. At this time, P1=−P1, and the formed diffracting surface is stepwise. That is, the power of the second surface is non-power.

Optical Deflector:

The polygon mirror 5 of the optical deflector has six reflective surfaces and an inradius of 13 millimeters.

The sound-shielding glass G1 of the optical deflector is made of the third glass, and has a thickness of 1.9 millimeters and a slope angle α in the y direction (vertical direction in the drawing) of 12 degrees.

Also, an angle θ formed between a progressing direction of a light beam entering from semiconductor laser 1 side as the light source and a progressing direction of the light beam reflected from the deflection reflecting surface toward a position at an image height of 0 on the surface to be scanned 8 is 68 degrees.

Variations in beam waist position in the main scanning direction and the sub-scanning direction according to the third embodiment are as in Table 18.

TABLE 18

| | Variation in beam waist position | |
|---|---|---|
| | Wavelength hop [mm] | Temperature variation [mm] |
| Main scanning direction | 1.14 | −0.52 |
| Sub-scanning direction | 1.94 | 0.03 |

It can be known that, with the effect of the diffracting surface, variations in beam waist position are reduced in both direction.

Figure 10A:
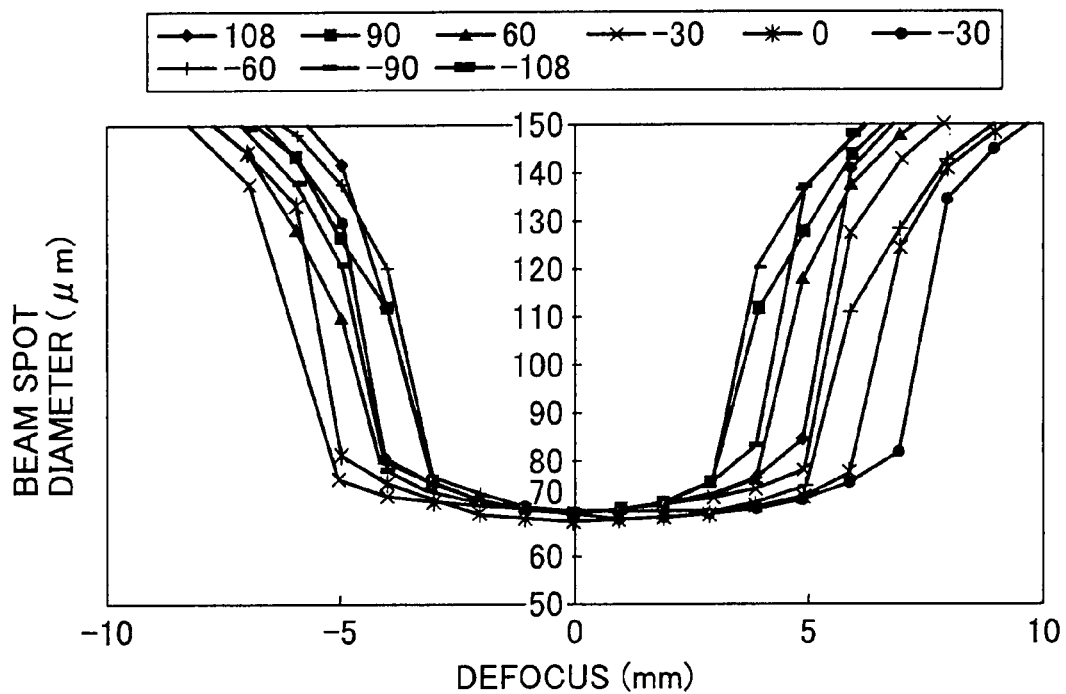
FIG. 10A is a graph depicting a relation between a defocus and a beam spot diameter in a main scanning direction of the optical scanning device according to the third embodiment.
Figure 10B:
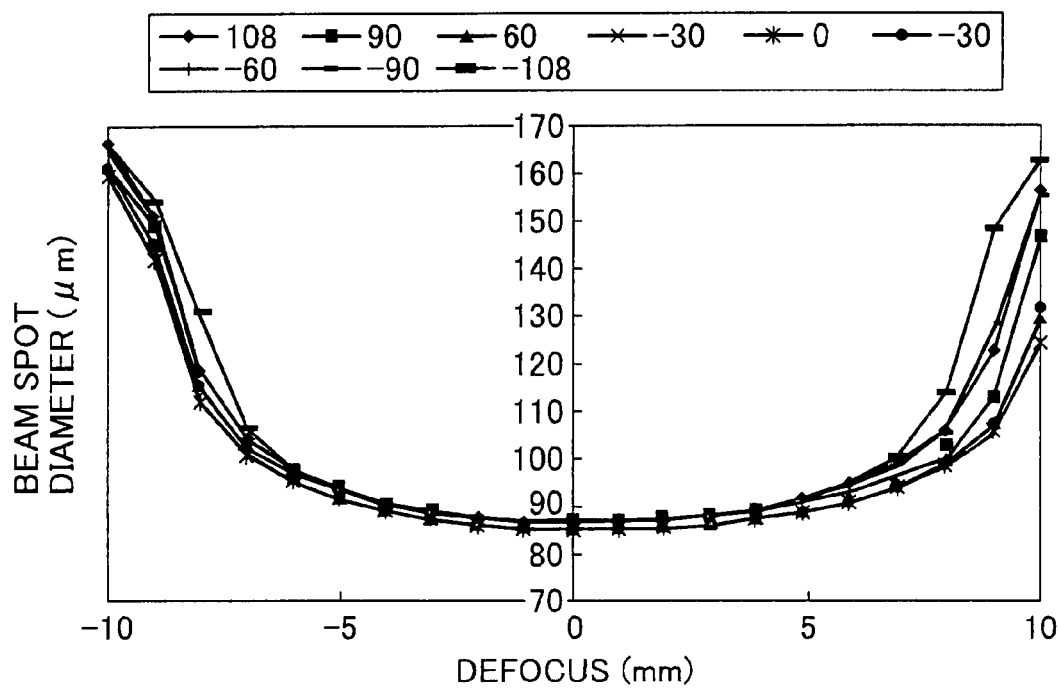
FIG. 10B is a graph depicting a relation between a defocus and a beam spot diameter in a sub-scanning direction of the optical scanning device according to the third embodiment.

A main-scanning beam spot diameter with respect to a defocus in the third configuration example is depicted in FIG. 10A, whilst a sub-scanning beam spot diameter with respect to a defocus in the third configuration example is depicted in FIG. 10B. FIG. 10A is a graph depicting a relation between a defocus and a beam spot diameter in a main scanning direction of the optical scanning device according to the third embodiment. FIG. 10B is a graph depicting a relation between a defocus and a beam spot diameter in a sub-scanning direction of the optical scanning device according to the third embodiment.

Next, the case is considered in which the diffracting surface according to the third configuration example has a process error.

For example, a groove distance of the power diffracting surface formed on the spherical surface, shaped in concentric circles, and adopted on the incident surface side of the anamorphic optical element 4 according to the third configuration example is gradually shortened as the groove distance is further away from the optical axis. This groove distance is on the order of 100 micrometers at minimum in the third configuration example. It is assumed herein that the groove distance has one of process errors of 2 micrometers, 4 micrometers, and 6 micrometers. Such an process error significantly varies the power of the anamorphic optical element. If such anamorphic optical element with a process error is mounted as it is on the optical scanning device, the light-gathering point of light beams is significantly shifted from the surface to be scanned, thereby increasing the beam spot.

If such an optical scanning device is developed to, in particular, a color optical printer, color reproducibility is deteriorated and gray scale is lost. However, since the amount of such a shift of the light-gathering point of light beams is approximately equal over the entire image height, the shift can be absorbed if this anamorphic optical element is moved in the optical axis direction.

Therefore, by providing a mechanism similar to that in FIG. 7 depicting an adjusting mechanism for correction of an error in focus distance of the anamorphic optical element of the optical scanning device according to the first or second embodiment, a desired beam spot can be obtained on the surface to be scanned even if the power diffracting surface provided to the anamorphic optical element has a process error.

As a matter of course, instead of providing such a mechanical system, in one scheme, when the anamorphic optical element is fixed to the optical scanning device, the anamorphic optical element is adjusted in position and is fixed with an adhesive. This is advantageous in that no adjusting mechanism is required and a component unnecessary after adjustment is prevented from remaining in the optical scanning device.

Here, as a premise of this scheme, a desired diffracting effect has to be achieved even with a process error in the anamorphic optical element. However, even if a process error of any one of 2 micrometers, 4 micrometers, and 6 micrometers is present in the groove distance, a diffracting effect with exactly the same value as the designed median value can be expected.

As has been explained above, according to the third embodiment, one surface on the optical path is provided with a circular stepwise diffracting surface, and the opposite surface is provided with an aspheric refractive surface. Also, a coupling lens formed so that the powers of the diffracting surface and the refractive surface are cancelled out is disposed on the optical path before reflection on the polygon mirror. With this, the occurrence of the diffused light and thickening the beam spot diameter can be prevented, thereby achieving stable scanning and exposure with an always-stable laser beam diameter.

An optical scanning device according to a fourth embodiment is explained in detail below. The fourth embodiment is different from the second embodiment in that an anamorphic optical element having one surface as a linear stepwise diffracting surface and the opposite surface as an aspheric diffracting surface is provided to cancel out lens powers and the diffracting direction is limited to one direction. The other components are similar to those of the optical scanning device according to the second embodiment. The same component are provided with the same reference numerals, and are not explained herein. A schematic configuration of an optical system of the optical scanning device according to the fourth embodiment is similar to that in FIG. 4 explained in the second embodiment.

Figure 11A:
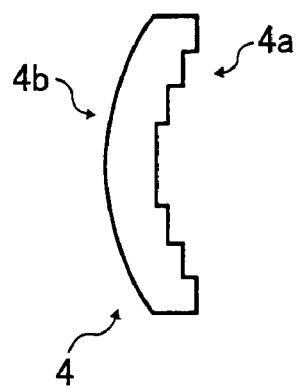
FIG. 11A is a cross-section view of an anamorphic optical element of an optical scanning device according to a fourth embodiment viewed from its side surface.
Figure 11B:
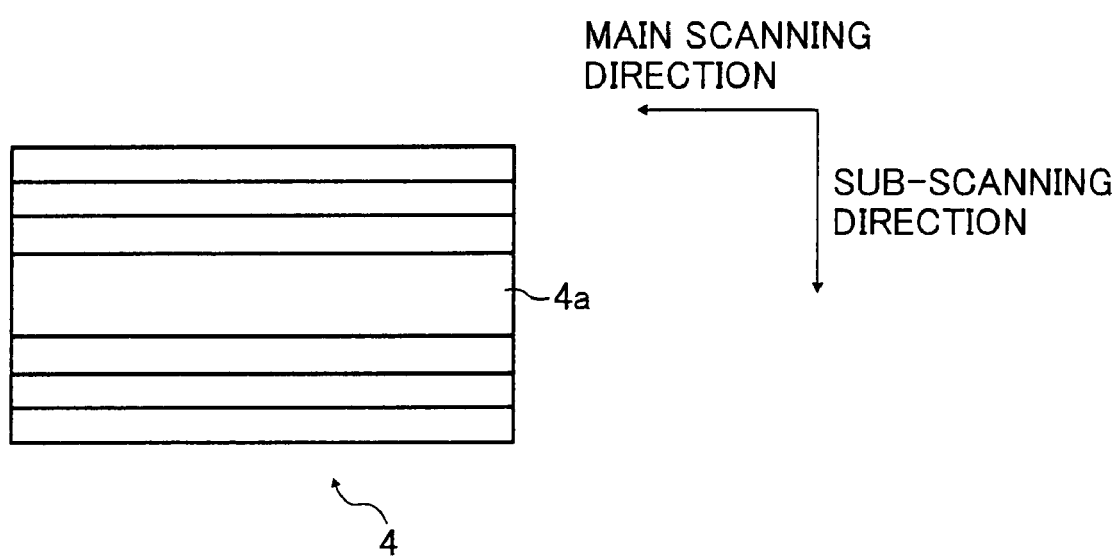
FIG. 11B is a front view of the anamorphic optical element of the optical scanning device according to the fourth embodiment viewed from an optical axis direction.

FIG. 11A is a cross-section view of an anamorphic optical element of the optical scanning device according to the fourth embodiment viewed from its side surface. FIG. 11B is a front view of the anamorphic optical element of the optical scanning device according to the fourth embodiment viewed from an optical axis direction. A first surface is a refractive surface 4b having a power only in a sub-scanning direction, and a second surface is a linear stepwise diffracting surface 4a elongated in the main scanning direction. At this time, the power in the sub-scanning direction satisfies the condition (4) and the equations (5) to (7). With this, an optical element with small variations in sub-scanning beam spot diameter and resistant to eccentricity between surfaces can be achieved.

Furthermore, the diffracting surface of the lens provided to the anamorphic optical element 4 as a second optical system has the same sub-scanning cross-section irrespectively of the position in the main scanning direction. With this, even when this lens is shifted to the main scanning direction, the optical characteristics do not change at all, thereby allowing an assembly error to be mitigated. Still further, at the time of multi-beams, a plurality of beams pass away in the main scanning direction. Even if the beams are away in the main scanning direction, the same temperature correcting effect of the beams are exactly the same, and the same optical characteristics can be achieved. Still further, the surface opposite to the diffracting surface has a positive power in the sub-scanning direction. With this, the function of linear image formation can be achieved. With non-power in the main scanning direction, the sub-scanning cross-section can be made the same irrespectively of the position in the main scanning direction, thereby achieving the effect explained above.

Still further, the diffracting surface 4a is stepwise. With this, similarly as explained above, a forming scheme can be adopted without causing process residues, such as those in shaper processing. With this, processing time can be also be reduced. From such a reduction in processing time, secondary merits are derived, such as a reduction in the occurrence of heat at the time of processing, which are preferable to obtain the diffracting surface 2a with high accuracy as depicted in FIG. 9A.

A fourth configuration example of the optical scanning device according to the fourth embodiment is explained in detail below. The configuration of the components in the fourth configuration example is depicted in FIG. 4, which depicts the entire optical system. The fourth configuration example is different from the third configuration example in that two lenses are provided as scanning lenses 6, that is, the first scanning lens 6-1 and a second scanning lens 6-2.

Data on a glass material (hereinafter, "fifth glass") and a resin material (hereinafter, "fourth resin") for use in the fourth configuration example is listed in Table 19.

TABLE 19

| | Material data | | | |
|---|---|---|---|---|
| | Median value | Wavelength hop | Temperature variation | Linear expansion coefficient |
| Fifth glass | 1.515141 | 1.515116 | 1.515062 | $7.5 \times 10^{-6}$ |
| Fourth resin | 1.527257 | 1.527229 | 1.525368 | $7.0 \times 10^{-5}$ |

In Table 19, a "median value" represents a refraction index with respect to a use wavelength at a reference temperature of 25 degrees Celsius, a "wavelength hop" represents a refraction index when a wavelength hop occurs due to a mode hop, and a "temperature variation" represents a refraction index when the temperature increases from the reference temperature by 20 degrees Celsius. In the "wavelength hop" due to a mode hope, a wavelength change of 0.8 nanometers is assumed for allowance.

Table 20 depicts data on optical system components disposed after the optical deflector.

TABLE 20

| OPTICAL SYSTEM DATA AFTER OPTICAL DEFLECTOR | | | | | |
|---|---|---|---|---|---|
| | $R_m$ | $R_s$ | Dx | Dy | n |
| Polygon mirror (Rotational axis) 5 | — | — | 43.3 | 2.9 | — |
| Scanning lens 6-1 | −110.142 | −472.788 | 8 | 0 | Second resin |
| | −57.939 | −500. | 101.1 | 0 | |
| Scanning lens 6-2 | −5000. | 93.8 | 3 | 0 | Second resin |
| | 724.16 | −60.71 | 139.9 | | |
| Surface to be scanned 8 | — | — | — | — | — |

In Table 20, $R_m$ represents a paraxial curvature in the main scanning direction, whilst $R_s$ represents a paraxial curvature in the sub-scanning direction. $D_x$ and $D_y$ each represent a relative distance from an origin of an optical element to an origin of the next optical element. All values are in millimeters.

For example, as for $D_x$ and $D_y$ with respect to the polygon mirror 5, when viewed from the rotational axis of the optical deflector (polygon mirror 5), the origin of an incident surface of the scanning lens 6-1 (an optical axis position of the incident side surface) is 43.3 millimeters away in the optical axis direction (x direction, that is, in a horizontal direction in FIG. 4) and 2.9 millimeters away in the main scanning direction (y direction, that is, in a vertical direction in FIG. 4).

Here, as depicted in FIG. 4, the dustproof glass G2 made of the fifth glass with a thickness of 1.9 millimeters is disposed between the scanning lens 6-1 and the surface to be scanned 8.

Each of the scanning lenses 6-1 and 6-2 are aspheric, and all surfaces are special surfaces that are each in a non-arc shape as given by the condition (4) in the main scanning direction and each have a curvature of a sub-scanning cross-section (a virtual cross-section parallel to the optical axis and the sub-scanning direction) varying according to the conditional equation (5) in the main-scanning direction.

Coefficients of the incident side surface (special surface) of the scanning lens 6-1 are listed in Table 21.

TABLE 21

| | Coefficient in main scanning direction | | Coefficient in sub-scanning direction |
|---|---|---|---|
| K | $0.000000 + 00$ | $B_1$ | 0 |
| $A_4$ | $-3.87482 \times 10^{-7}$ | $B_2$ | 0 |
| $A_6$ | $6.88714 \times 10^{-10}$ | $B_3$ | 0 |
| $A_8$ | $-3.02912 \times 10^{-13}$ | $B_4$ | 0 |
| $A_{10}$ | $-1.381964 \times 10^{-16}$ | $B_5$ | 0 |
| $A_{12}$ | $4.973160 \times 10^{-20}$ | $B_6$ | 0 |
| — | | $B_7$ | 0 |
| — | | $B_8$ | 0 |

Coefficients of the ejection side surface (special surface) of the scanning lens 6-1 are listed in Table 22.

TABLE 22

| Coefficient in main scanning direction | | Coefficient in sub-scanning direction | |
|---|---|---|---|
| K | $0.000000 + 00$ | $B_1$ | $6.44465 \times 10^{-6}$ |
| $A_4$ | $1.46716 \times 10^{-7}$ | $B_2$ | $-2.76702 \times 10^{-6}$ |
| $A_6$ | $2.24364 \times 10^{-10}$ | $B_3$ | $-1.17939 \times 10^{-8}$ |
| $A_8$ | $-1.24578 \times 10^{-14}$ | $B_4$ | $-7.27004 \times 10^{-9}$ |
| $A_{10}$ | $5.54989 \times 10^{-18}$ | $B_5$ | $3.89316 \times 10^{-11}$ |
| $A_{12}$ | $-8.15818 \times 10^{-20}$ | $B_6$ | $-5.12653 \times 10^{-12}$ |
| — | | $B_7$ | $-3.86625 \times 10^{-14}$ |
| — | | $B_8$ | $1.12285 \times 10^{-14}$ |

Coefficients of the incident side surface (special surface) of the scanning lens 6-2 are listed in Table 23.

TABLE 23

| Coefficient in main scanning direction | | Coefficient in sub-scanning direction | |
|---|---|---|---|
| K | $0.000000 + 00$ | $B_1$ | $4.98759 \times 10^{-7}$ |
| $A_4$ | $9.47700 \times 10^{-8}$ | $B_2$ | $-9.40784 \times 10^{-7}$ |
| $A_6$ | $-7.06270 \times 10^{-12}$ | $B_3$ | $5.110059 \times 10^{-11}$ |
| $A_8$ | $1.70056 \times 10^{-16}$ | $B_4$ | $7.50683 \times 10^{-11}$ |
| $A_{10}$ | $-6.11408 \times 10^{-20}$ | $B_5$ | $-5.15221 \times 10^{-15}$ |
| $A_{12}$ | $3.00776 \times 10^{-24}$ | $B_6$ | $-4.81012 \times 10^{-15}$ |
| — | | $B_7$ | $-1.46189 \times 10^{-19}$ |
| — | | $B_8$ | $7.21434 \times 10^{-19}$ |
| — | | $B_9$ | $2.22208 \times 10^{-23}$ |
| — | | $B_{10}$ | $-2.53749 \times 10^{-23}$ |

Coefficients of the ejection side surface (special surface) of the scanning lens 6-2 are listed in Table 24.

TABLE 24

| | Coefficient in main scanning direction | | Coefficient in sub-scanning direction |
|---|---|---|---|
| K | 0.000000 + 00 | $B_1$ | 0 |
| $A_4$ | $-5.56255 \times 10^{-8}$ | $B_2$ | $2.09875 \times 10^{-7}$ |
| $A_6$ | $5.42541 \times 10^{-12}$ | $B_3$ | 0 |
| $A_8$ | $-6.15064 \times 10^{-16}$ | $B_4$ | 0 |
| $A_{10}$ | $-2.44542 \times 10^{-20}$ | $B_5$ | 0 |
| $A_{12}$ | $1.76451 \times 10^{-24}$ | $B_6$ | 0 |
| — | | $B_7$ | 0 |
| — | | $B_8$ | 0 |

Each component of the optical system in the configuration example 4 is configured as follows.

Here, the optical elements of the optical system before the polygon mirror 5 are appropriately arranged so that the image formation position in the main scanning and sub-scanning of the entire optical system is near the surface to be scanned 8.

Light Source:

The semiconductor laser 1 as a light source has a designed light-emitting wavelength of 655 nanometers. When the temperature increases by 1 degree Celsius with respect to the normal temperature of 25 degrees Celsius, the light-emitting waveform is shifted by 0.20 nanometers to a long wavelength side. As for the mode hop, a wavelength change of 0.8 nanometers is assumed, as mentioned above.

Coupling Lens:

The coupling lens 2 is made of glass, has a refractive index as depicted in Table 19, and is disposed so as to have a focal length of 15 millimeters and a function for conversion to an approximately parallel light beam. Although the aspheric coefficient is not disclosed herein, with the aspheric surface, wave aberration of the light beam converted to have a desired cross-section shape is sufficiently corrected.

The semiconductor laser 1 and the coupling lens 2 are fixedly held by a holding member made of a material with a linear expansion coefficient of $2.3 \times 10^{-5}$, such as aluminum.

Aperture:

The aperture 3 has a rectangular opening with an opening diameter of 5.4 millimeters in the main scanning direction and an opening diameter of 2.28 millimeters in the sub-scanning direction. With the coupling lens 2, beam shaping is performed so that the light beam has a desired cross-section.

Anamorphic Optical Element:

The anamorphic optical element 4 has an incident side surface formed in a cylindrical surface having a power only in the sub-scanning direction and an ejection side surface formed as a stepwise diffracting surface with oval diffracting grooves.

The radius of curvature of an incident plane in a sub-scanning direction is 63.4 millimeters. The ejection surface is a diffracting surface, and a phase function $\phi(y, z)$ of the diffracting surface is represented by the following equation.

$$\phi(y,z) = C_1 \cdot Y^2 + C_2 \cdot Z^2$$

$C_1 = -0.0006199$, $C_2 = -0.007537$

This diffracting surface is formed on a toroidal surface having a main-scanning radius of curvature of 425.4 and a sub-scanning radius of curvature of 35, and a stepwise diffracting surface with oval diffracting grooves is formed.

At this time, P1=−P2 in both of the main scanning and sub-scanning directions, and the formed diffracting surface is stepwise. That is, the power of the second surface is non-power.

Optical Deflector:

The optical deflector has four reflective surfaces and an inradius of 7 millimeters.

The sound-shielding glass G1 of the polygon mirror 5 is made of the fifth glass, and has a thickness of 1.9 millimeters and a slope angle α in the y direction (vertical direction in the drawing) of 16 degrees.

Also, an angle θ formed between a progressing direction of a light beam entering from semiconductor laser 1 side and a progressing direction of the light beam reflected from the deflection reflecting surface toward a position at an image height of 0 on the surface to be scanned 8 is 60.55 degrees.

Variations in beam waist position in the main scanning direction and the sub-scanning direction according to the fourth configuration example are as in Table 25.

TABLE 25

| | Variation in beam waist position | |
|---|---|---|
| | Wavelength hop [mm] | Temperature variation [mm] |
| Main scanning direction | 0.11 | 0.04 |
| Sub-scanning direction | 0.18 | 0.16 |

It can be known that, with the effect of the diffracting surface, variations in beam waist position are reduced in both direction.

Figure 12A:
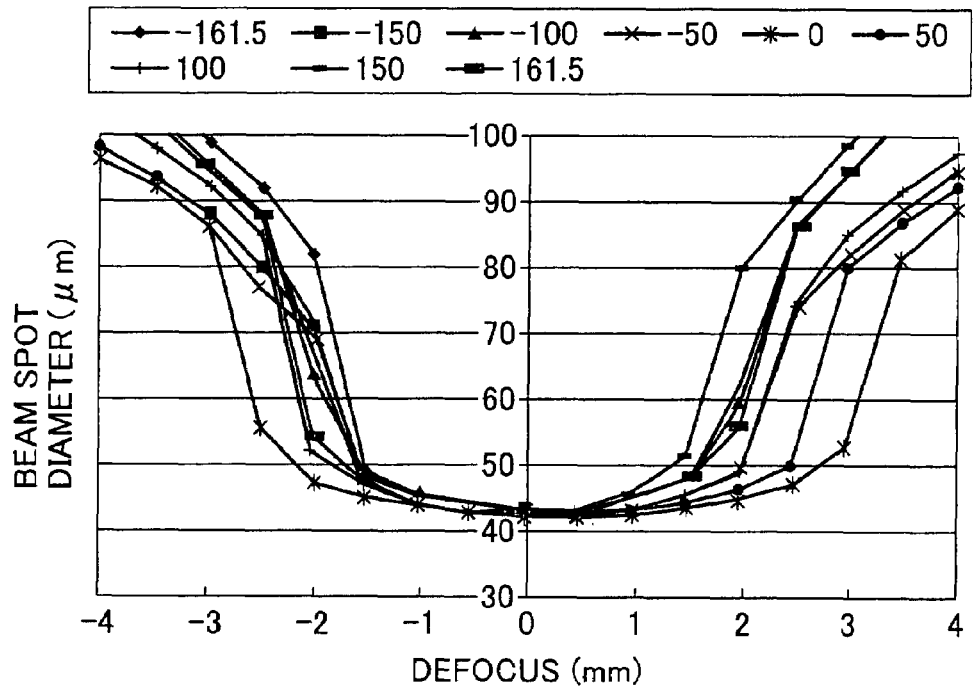
FIG. 12A is a graph depicting a relation between a defocus and a beam spot diameter in a main scanning direction of the optical scanning device according to the fourth embodiment.
Figure 12B:
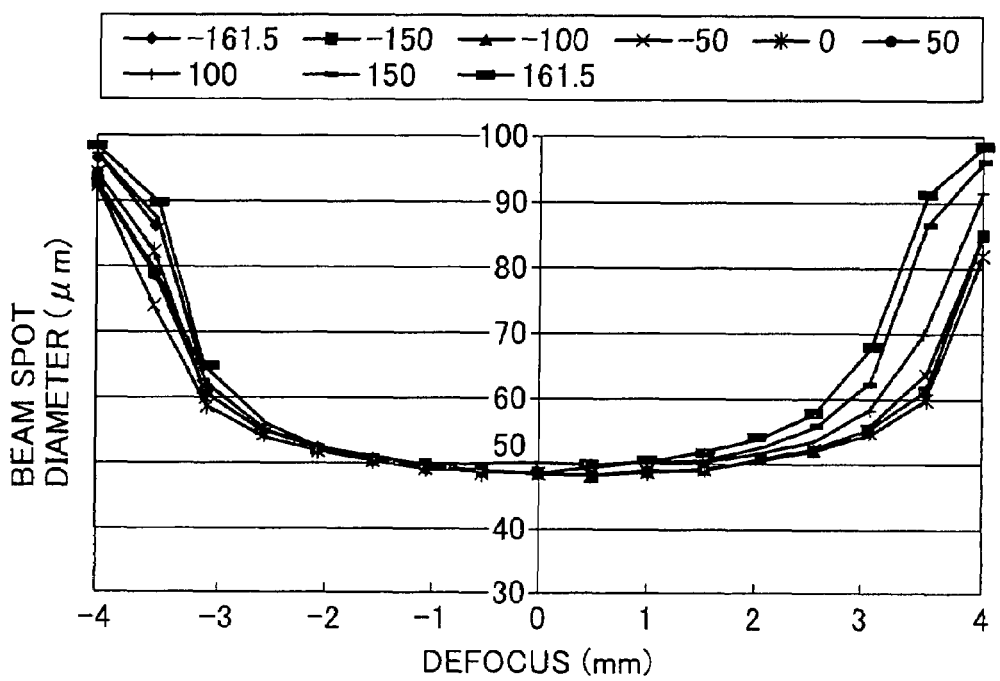
FIG. 12B is a graph depicting a relation between a defocus and a beam spot diameter in a sub-scanning direction of the optical scanning device according to the fourth embodiment.

A main-scanning beam spot diameter with respect to a defocus in the fourth configuration example is depicted in FIG. 12A, whilst a sub-scanning beam spot diameter with respect to a defocus in the fourth configuration example is depicted in FIG. 12B. FIG. 12A is a graph depicting a relation between a defocus and a beam spot diameter in a main scanning direction of the optical scanning device according to the fourth embodiment. FIG. 12B is a graph depicting a relation between a defocus and a beam spot diameter in a sub-scanning direction of the optical scanning device according to the fourth embodiment.

As has been explained above, according to the fourth embodiment, an anamorphic optical element including a first surface as an aspheric refractive surface having a power only in the sub-scanning direction and its opposite surface as a linear stepwise diffracting surface elongated in the main scanning direction is disposed on an optical path before reflection of the polygon mirror. Also, another anamorphic optical element that corrects only in the main scanning direction is disposed on an optical path after an fθ lens. With this, the occurrence of the diffused light and thickening the beam spot diameter can be prevented, thereby achieving stable scanning and exposure with an always-stable laser beam diameter.

An optical scanning device according to a fifth embodiment is explained in detail below. The fifth embodiment is different from the second embodiment in that an anamorphic optical element is provided with one surface as an aspheric refractive surface and its opposite surface as an oval stepwise diffracting surface. The other components are similar to those of the optical scanning device according to the second embodiment. The same component are provided with the same reference numerals, and are not explained herein. A schematic configuration of an optical system of the optical scanning device according to the fifth embodiment is similar to that in FIG. 4 explained in the second embodiment.

Figure 13A:
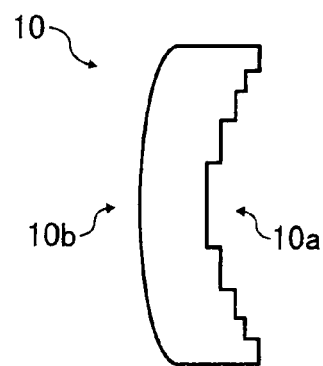
FIG. 13A is a cross-section view of an anamorphic optical element according to a fifth embodiment viewed from its side surface.
Figure 13B:
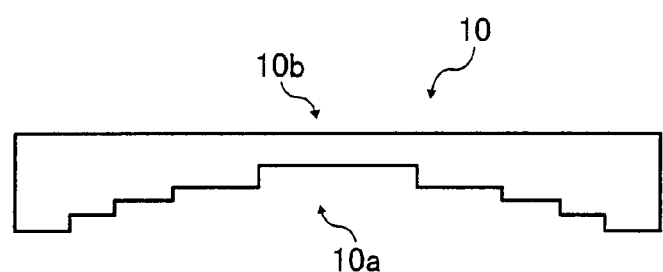
FIG. 13B is a cross-section view of the anamorphic optical element according to the fifth embodiment viewed from its upper surface.
Figure 13C:
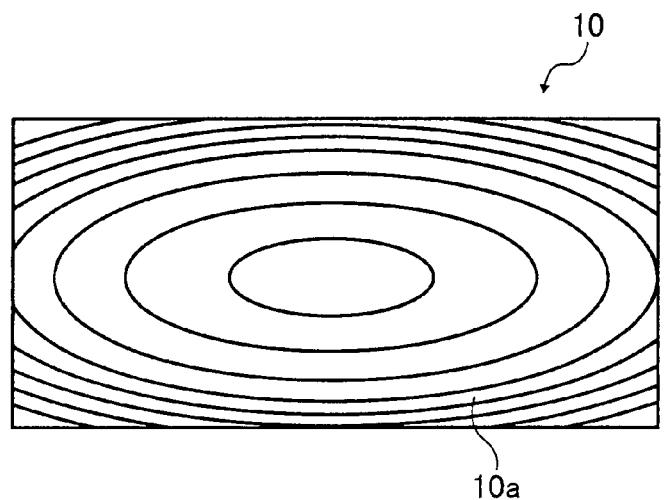
FIG. 13C is a front view of the anamorphic optical element according to the fifth embodiment viewed from an optical axis direction.
Figure 14A:
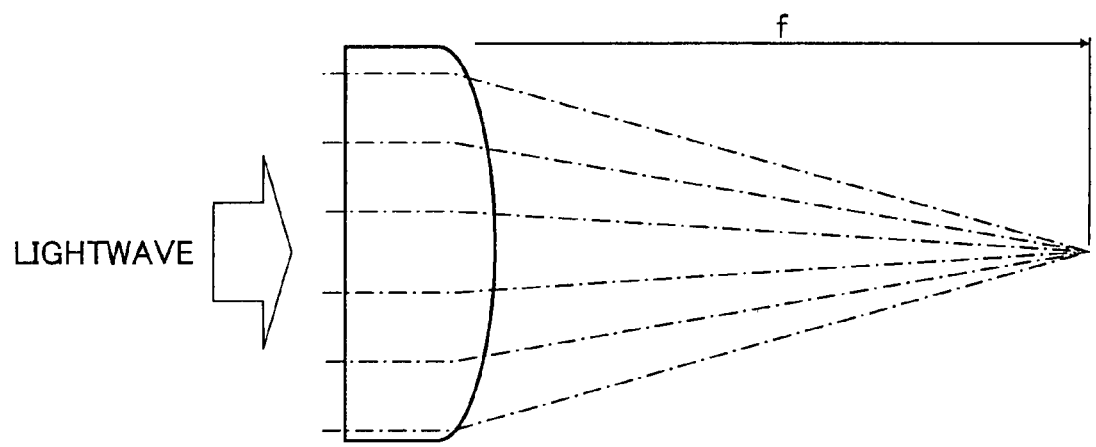
FIG. 14A is an optical schematic view of a light-gathering state of a spherical lens according to a conventional example.
Figure 14B:
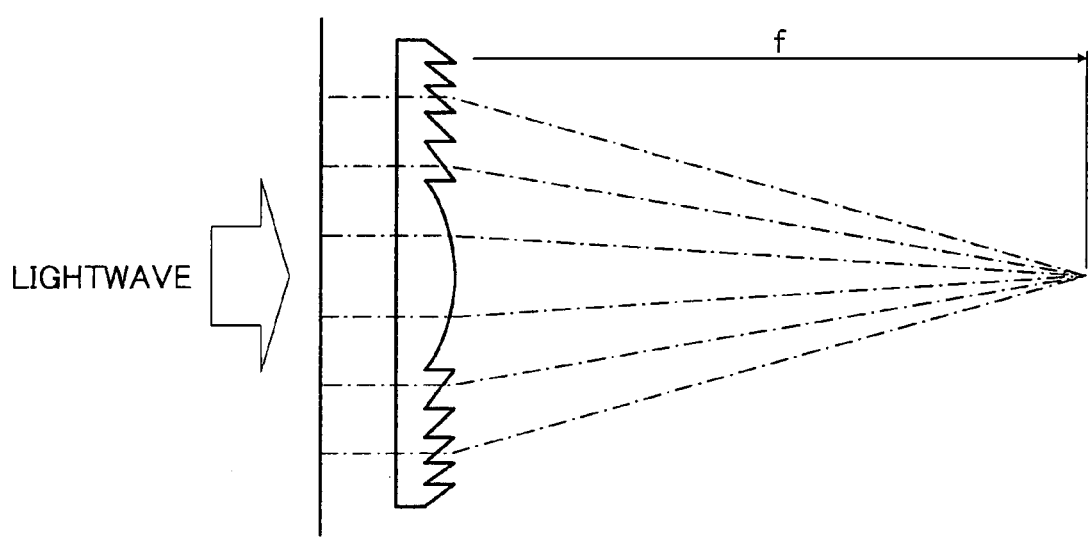
FIG. 14B is an optical schematic view of a light-gathering state of a power diffracting surface according to the conventional example.

FIGS. 13A, 13B, and 13C are drawings for explaining a configuration example of the anamorphic optical element according to the fifth embodiment. FIG. 13A is a cross-section view viewed from a side surface. FIG. 13B is a cross-section view viewed from an upper surface. FIG. 13C is a front view viewed from an optical axis direction. As depicted in these drawings, an anamorphic optical element 10 has oval and stepwise diffracting grooves formed on a diffracting surface 10a. 10b denotes an aspheric refractive surface.

With the diffracting grooves on the diffracting surface 10a being formed in an oval shape, an arbitrary temperature correction effect can be obtained even if only one surface is adopted as the diffracting surface 10a. Also, with only one surface being adopted as the diffracting surface 10a, the light amount can be ensured, and the speed can be easily increased. Furthermore, with the diffracting grooves being formed stepwise, an effect similar to that explained above can be achieved.

In the fifth embodiment, with the coupling lens 2 (first optical system) and the anamorphic optical element 4 (second optical system), diverged light beams emitted from the semiconductor laser 1 become a long linear image near the deflecting surface in the main scanning direction. Therefore, a combined power of the first optical system and the second optical system in the sub-scanning direction is larger than that in the main scanning direction. Since the power on the diffracting surface side is near 0, by increasing the power in the sub-scanning direction more than the power in the main scanning direction on the refractive surface side, a linear image forming function can be provided to the diffracting lens.

As has been explained above, according to the fifth embodiment, with a refractive surface having a power only in one direction being provided to a first surface of the anamorphic optical element and an oval stepwise diffractive surface being provided to the opposite surface thereof, the occurrence of the diffused light and thickening the beam spot diameter can be prevented, thereby achieving stable scanning and exposure with an always-stable laser beam diameter.

Also, in the first to fifth embodiments explained in detail above, the coupling lens 2 (first optical system), the anamorphic optical element 4 (second optical system), and the scanning lens 6 (third optical system) are all formed of resin-made lenses, thereby achieving low cost, light weight, and easy recycling.

Furthermore, in the first to fifth embodiments explained in detail above, the light source is formed as a multi-beam light source so as to emit a plurality of light beams, high speed can be achieved. In particular, the surface shape of the diffracting surface of the lens is formed in a stepwise configuration allowing approximately non-power. With this, an optical scanning device having excellent optical characteristics and resistant to an influence of eccentricity between surfaces even if the positions through which the beams pass are relatively different at the time of adoption of multi-beams is provided.

As in the first to fifth embodiments explained in detail above, the diffracting surface adopted for the resin-made lens of the anamorphic optical element 4 has the same sub-scanning cross-section irrespectively of the position in the main scanning direction. Also, the surface opposite to the diffracting surface is made non-power in the main scanning direction and is also made as a refractive surface having a positive power in the sub-scanning direction. With this, at the time of multi-beams, a plurality of beams pass so as to be away in the main scanning direction, but, even if the beams are away in the main scanning direction, the same temperature correction effects of the beams and the same optical characteristics can be achieved.

As an optical scanning device that performs an exposure process of the image forming apparatus according to the embodiments, any of the optical scanning devices explained in the first to fifth embodiments is provided. With this, an always-stable beam spot diameter can be achieved. Also, a compact image forming apparatus suitable for high-definition printing can be achieved at low cost.

The image forming apparatus according to the present embodiments can include one photosensitive member as an image carrier, and can be configured as a monochrome image forming apparatus including an optical scanning device supporting the photosensitive member. At least one of the first optical element, the second optical element, and the third optical element can be a resin-made lens, and a power diffracting surface can be formed on at least one of the resin-made lenses.

The optical scanning device according to the present embodiments is suitable for an multicolor image forming apparatus in which a plurality of scanning optical systems are provided and a plurality of image carriers (photosensitive members) are disposed. Here, at this time, the number of installed deflecting units (polygon mirrors) may be one or more.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanning device comprising:
   a first optical element that converts a cross-section shape of a light beam from a semiconductor laser to a desired shape;
   a second optical element that guides the light beam output from the first optical element to an optical deflector that deflects the light beam; and
   a third optical element that gathers the light beam deflected by the optical deflector onto a surface to be scanned to form a light spot thereby optically scanning the surface, wherein
   at least one of the first optical element, the second optical element, and the third optical element includes a resin-made lens, at least one of the resin-made lenses has a power diffracting surface, and a surface shape of at least one of power diffracting surfaces is formed so that a power of a diffracting portion and a power of a refractive portion are cancelled out.

2. The optical scanning device according to claim 1, wherein the surface shape of the power diffracting surface has a stepwise configuration and approximately non-power.

3. The optical scanning device according to claim 1, wherein the power diffracting surface is formed so that variation in beam waist position in either one or both of a main scanning direction and a sub-scanning direction due to a mode hop or a temperature change in the semiconductor laser is approximately zero.

4. The optical scanning device according to claim 1, wherein the power diffracting surface is provided to the first optical element, and has a rotation-symmetrical stepwise configuration.

5. The optical scanning device according to claim 4, wherein a surface opposite to the power diffracting surface of the first optical element is a rotation-symmetrical aspheric surface.

6. The optical scanning device according to claim 1, wherein the power diffracting surface is provided to the second optical element, and has a linear-symmetrical stepwise configuration.

7. The optical scanning device according to claim 6, wherein the second optical element is a lens having non-power in a main scanning direction and a positive power in a sub-scanning direction.

8. The optical scanning device according to claim 1, wherein all of the first optical element, the second optical element, and the third optical element are resin-made lenses.

9. The optical scanning device according to claim 1, wherein the second optical element is adjustable along an optical axis direction.

10. An image forming apparatus comprising:
an optical scanning unit that performs optical scanning on a photosensitive image carrier to form a latent image;
a developing unit that visualizes the latent image as a toner visualized image; and
an image forming unit that generates an image from the toner visualized image, wherein
the optical scanning unit is the optical scanning device according to claim 1.

* * * * *